United States Patent [19]

Hester

[11] 4,040,036
[45] Aug. 2, 1977

[54] INPUT GROUPING ARRANGEMENT FOR DATA GATHERING

[75] Inventor: Sidney Dean Hester, Pickerington, Ohio

[73] Assignee: Bell Telephone Laboratories, Incorporated, Murray Hill, N.J.

[21] Appl. No.: 690,099

[22] Filed: May 26, 1976

[51] Int. Cl.$^2$ .................................. G06F 13/00
[52] U.S. Cl. ................................................ 364/900
[58] Field of Search ........... 340/172.5, 147 C, 147 G; 179/15 AQ, 15 BW, 18 FF, 18 AB, 18 FG, 7 R, 7 MM, 8 P

[56] References Cited

U.S. PATENT DOCUMENTS

| | | | |
|---|---|---|---|
| 3,281,793 | 10/1966 | Oeters | 340/172.5 |
| 3,344,406 | 9/1967 | Vinal | 340/172.5 |
| 3,629,855 | 12/1971 | Conley | 340/172.5 |
| 3,736,381 | 5/1973 | Johnson | 179/15 AQ |
| 3,927,267 | 12/1975 | Voyer | 179/15 AQ |
| 3,936,611 | 2/1976 | Poole | 179/18 FG |

Primary Examiner—James D. Thomas
Attorney, Agent, or Firm—S. N. Turner

[57] ABSTRACT

A system is provided for gathering by input groups the counts of busy conditions of 1,024 inputs terminated on 32 input scan cards with each card terminating 32 inputs. A scan circuit selects the cards one at a time in succession for scanning and causes the inputs of each selected card to be scanned one input at a time in succession so that a single output lead common to all inputs of all cards carries a succession of busy signals according to successively scanned busy inputs. Each card is provided with a switch settable into one of five positions according to whether the count of busy input conditions of that card is to be accumulated in groups of one, two, eight, 32, or 64 inputs. A grouping circuit counts the number of successively scanned inputs and provides a succession of groups signals corresponding to successive counts of the numbers of inputs specified as successive groups by the switch settings of successively selected cards. A memory match circuit generates a succession of different seven-digit straight binary codes corresponding to successive group signals. The 128 possible seven-digit codes (0000000 to !111111) correspond to the memory access addresses of a 128-section memory circuit. An addressing circuit generates all 128 codes each time that each single input is scanned; and, the memory access circuitry of the memory circuit is advanced in synchronism with the generation of all 128 codes by the addressing circuit. The memory match circuit allows each input busy signal to be accumulated as part of an input group busy count at that memory address corresponding to that one of the 128 codes which matches the code generated by the memory match circuit.

19 Claims, 36 Drawing Figures

(S1 TO S32)

(IB0 TO IB4)

(B0 TO B3)

(BLK1 TO BLK3)

| DECIMAL | B0 | B1 | B2 | B3 | BLK1 | BLK2 | BLK3 |
|---|---|---|---|---|---|---|---|
| 0 | L | L | L | L | L | L | L |
| 1 | H | L | | | | | |
| 2 | L | H | | | | | |
| 3 | H | H | | | | | |
| 4 | REPEAT | REPEAT | H | | | | |
| 5 | | | | | | | |
| 6 | | | | | | | |
| 7 | | | | | | | |
| 8 | | | REPEAT | H | | | |
| 15 | | | | | | | |
| 16 | | | | | H | | |
| 31 | | | | REPEAT | | | |
| 32 | | | | | | H | |
| 63 | | | | | REPEAT | | |
| 64 | | | | | | | H |
| 127 | | | | | | REPEAT | |

FIG.36

| DECIMAL | | 0-31 | | | | 0-15 | 16-31 |
|---|---|---|---|---|---|---|---|
| | | IB0 | IB1 | IB2 | IB3 | IB4 | IB4 |
| 16 | 0 | L | L | ↑ | ↑ | ↑ | ↑ |
| 17 | 1 | H | L | | | | |
| 18 | 2 | L | H | L | | | |
| 19 | 3 | H | H | | L | | |
| 20 | 4 | ↑ | ↑ | ↕ | | | |
| 21 | 5 | | | | | | |
| 22 | 6 | | | H | | | |
| 23 | 7 | | | | ↓ | | |
| 24 | 8 | | | ↓ | ↑ | L | H |
| 25 | 9 | REPEAT | REPEAT | | | | |
| 26 | 10 | | | ↑ | | | |
| 27 | 11 | | | REPEAT | H | | |
| 28 | 12 | | | | | | |
| 29 | 13 | | | | | | |
| 30 | 14 | | | | | | |
| 31 | 15 | ↓ | ↓ | ↓ | ↓ | ↓ | ↓ |

INPUT GROUPING ARRANGEMENT FOR DATA GATHERING

BACKGROUND OF THE INVENTION

The invention lies generally in the field of systems wherein data is gathered pertaining to the statuses of a plurality of inputs, lies more particularly in the type of such systems wherein the inputs are scanned one at a time in a prescribed sequence and wherein input status data on successively scanned inputs is detected by an output common to all inputs, and lies still more particularly in the type of such systems wherein the data detected by the common output is stored in memory having addressable memory locations to which the common output data is steered for storage according to generated memory location addresses.

In the prior art of such systems as the above, such as U.S. Pat. No. 3,546,678 to W. B. Callaway et al. of Dec. 8, 1970 and such as U.S. Pat. No. 3,732,547 to R. H. Etra of May 8, 1973, it has been necessary to advance memory access in synchronism with input scanning so that with respect to successively scanned inputs or to successively scanned groups of inputs the related status data on the common output has been steered into the corresponding memory locations by virtue of the synchronism between the scanned input positions and the corresponding memory location access. With regard particularly to the storage of status data for groups of inputs, it has been necessary either to parallel all inputs of a group so that any status data for the group appears on the common output at one particular scanned input position corresponding to one particular memory location or to dedicate certain scanned input positions to memory locations for groups of inputs whose status data is accumulated externally of the memory and steered into the memory locations corresponding to the dedicated scanned input positions.

While the above prior types of input grouping arrangements have proven quite workable, there is a constant effort made to provide grouping arrangements which do not depend upon paralleling grouped inputs to particular scanned input positions and which do not require the dedicated use of input positions to define input groupings.

The prior art has provided an arrangement for employing a control memory word for each scanned input position where each control word includes instructions defining the accumulator memory location address of the input grouping for each scanned input so that accumulator memory access circuitry can be controlled according to the preassigned memory location addresses of specified input groups. An example of the latter type of input grouping arrangement is found in U.S. Pat. No. 3,982,232 to R. H. Etra of Sept. 21, 1976. An arrangement such as in the Etra applicaton precludes the necessity for paralleling grouped inputs to particular scanned input positions and precludes the necessity for dedicated use of input positions to define input groupings; but, such an arrangement requires synchronization of scanning with access to control word memory location and requires additional circuitry for using the control word for subsequently accessing accumulator memory.

The present invention precludes the necessity for synchronization of input scanning with corresponding input memory access, precludes the necessity for paralleling groups of inputs to particular scanned input positions, and precludes the necessity for dedicated use of input position to define input groupings.

SUMMARY OF THE INVENTION

The invention precludes the above undesirable aspects of the prior art systems by providing an input grouping arangement wherein successive inputs are scanned according to a succession of scan signals, wherein selectively settable means is used to define groups of inputs with each group containing one or more successively scanned inputs, wherein a succession of group signals corresponding to a succession of scanned groups is supplied under the joint control of the scan signals and of the settable means, and wherein a succession of different memory location addresses is generated corresponding to the succession of group signals and each such memory location address is generated during the scanning of each input of the corresponding group.

By the use of the invention, the inputs may be grouped in any desired group size from groups of one (i.e., individual inputs) up to groups of any desired number of successive inputs merely by selecting the desired setting of the settable means. Also, since each input grouping causes a different memory address to be generated, the latter defines itself insofar as access to memory is concerned.

The invention more particularly provides for causing the settable means to specify the number of scan signals corresponding to each input group, for counting successive scan signals, for producing a group signal for each count of the specified number of scan signals, and for generating a different memory location address for each group signal with each such memory location address being generated during the scanning of each input of the corresponding group.

The invention also more particularly provides for using memory location addresses defined as multibit binary codes and for generating a different such code for each group signal.

The invention is embodied herein by example in a data gathering system wherein the generated memory location addresses are used to steer the grouped status data to the corresponding address locations in accumulator memory. The particular method and means for accomplishing that steering function is not part of the present invention: it uses the well-known technique of comparing for each scan signal all possible memory location addresses with each generated address and using the matching address for memory access.

BRIEF DESCRIPTION OF THE DRAWING

The drawing consists of 17 sheets containing 36 Figures briefly describable as follows.

DETAILED DESCRIPTION

Figure 1:
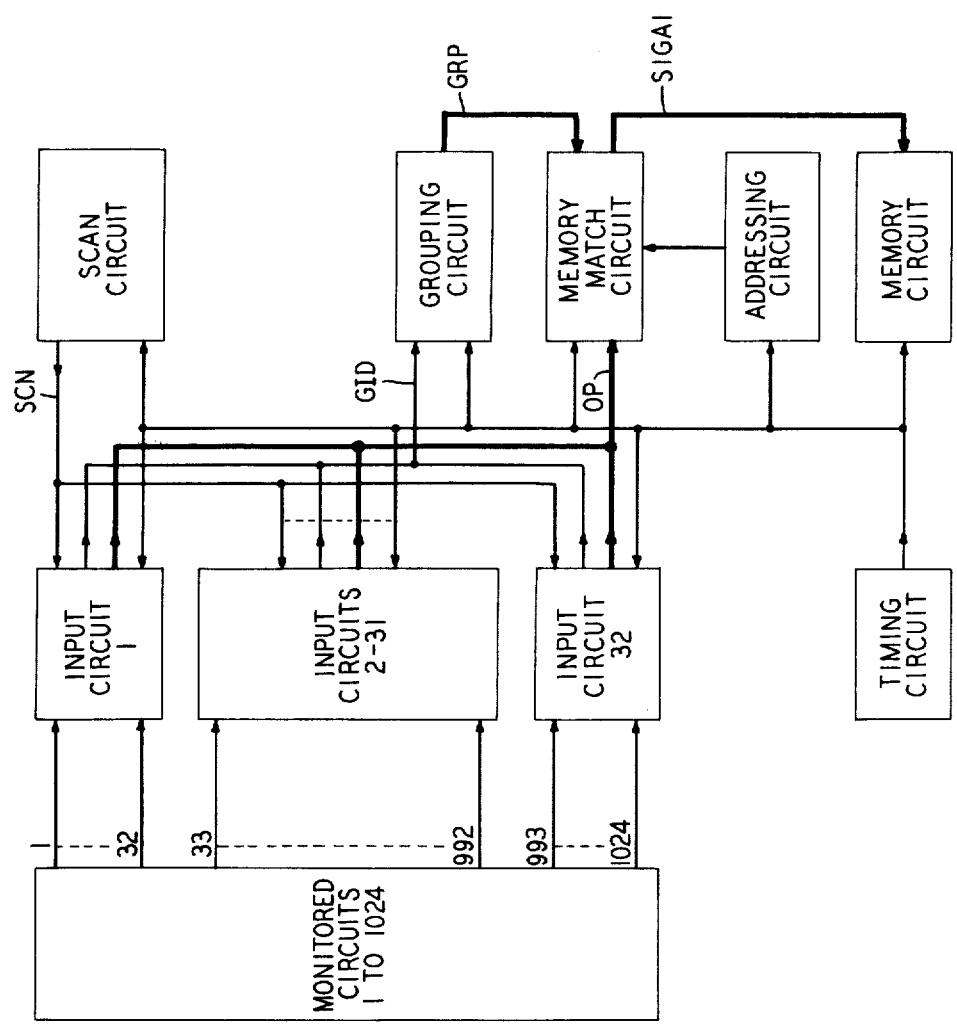
FIG. 1 is a functional block diagram of the major components of the exemplary embodiment.

THe detailed description of the exemplary embodiment illustrated in the drawing is set forth in a number of subsections in the order set forth and entitled as follows:

Functional Block DIagram (FIG. 1)
Interconnection Block Diagram (FIG. 2)
Timing Circuit (FIGS. 27 and 28)
Simple Circuit Symbols and Conventions (FIG. 9)
Scan Circuit (FIG. 3)
Input Circuit (FIG. 4)
Grouping Circuit (FIG. 5)
Addressing Circuit (FIG. 6)
Memory Match Circuit (FIG. 8)
Memory Circuit (FIG. 7)
Functional Block Diagram (FIG. 1)

FIG. 1 illustrates the general functional relationships among various major components of a system for gathering data by input groups pertaining to the busy statuses of 1,024 inputs (i.e., monitored circuits). Under the control of a suitable signal from the Timing Circuit, the scanning of inputs is started by the Scan Circuit, whereupon Input Circuits 1 through 32 are selected one at a time for scanning and whereupon the 32 inputs of each selected Input Circuit are scanned one input at a time. An output line OP is common to all inputs and carries a busy signal each time any scanned input is found to be busy. As each Input Circuit is selected for scanning, the Scan Circuit allows the selected Input Circuit to inform the Grouping Circuit, over a group of leads represented by the line GID, as to the number (e.g., 1, 2, 8, 32, or 64) of successively scanned inputs which are in a group. The Grouping Circuit counts the number of successively scanned inputs and provides a group signal on line GRP each time the count reaches the group number specified by the selected Input Circuit. Each time the Memory Match Circuit receives a group signal on line GRP, it generates a different memory location address (e.g., one of 128 possible seven-digit binary numbers). The Addressing Circuit is controlled by the Timing Circuit to generate all 128 memory addresses each time a single input is scanned; and, the Memory Circuit (e.g., a 128-position shift register) is controlled by the Timing Circuit so that its memory location addressing is synchronized with the generation by the Addressing Circuit of the 128 memory addresses. When the Memory Match Circuit finds a match between the memory address it generates and the memory address generated by the Addressing Circuit, the Memory Match Circuit allows the busy signal on line OP to appear on line SIG Al so that such busy signal may be accumulated in the Memory Circit storage location assigned to the corresponding group of inputs.

The system devotes about 9.09 milliseconds (ms) each to the scanning of each input, performs a full input scanning cycle (i.e., scans all 1,024 inputs) in about 10 seconds (sec), and starts each full input scanning cycle once every 100 sec.

INTERCONNECTION BLOCK DIAGRAM (FIG. 2)

Figure 2:
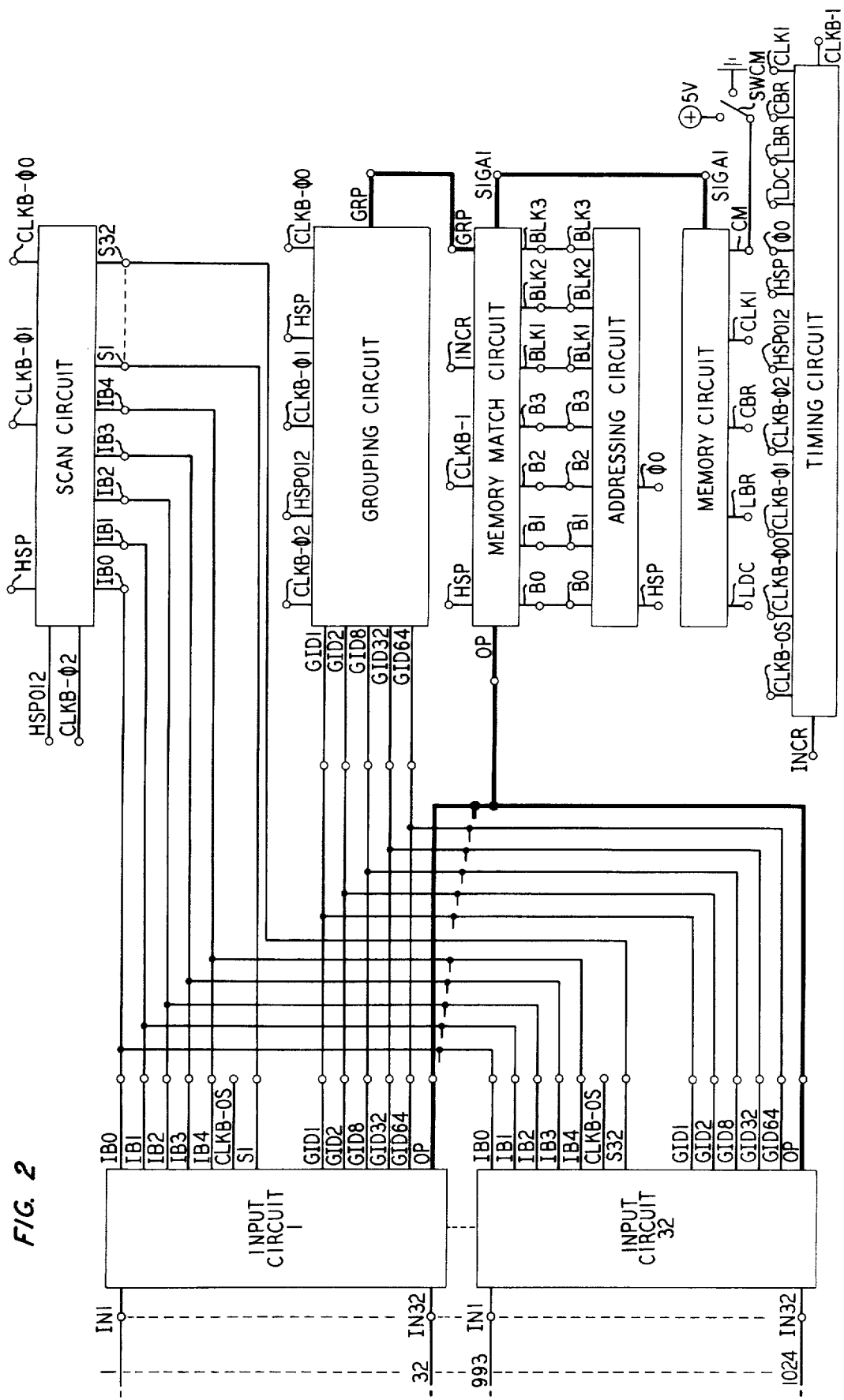
FIG. 2 is an interconnection block diagram showing all of the interconnections between the major components of FIG. 1 except, as will be explained, for the interconnections of timing signals.

FIG. 2 shows the interconnection of all leads (except timing leads as discussed below) between the major components of the system. Each of the major components is described separately hereinafter with the understanding that the leads extending therefrom or thereto are connected as shown in FIG. 2.

In FIG. 2, the timing leads extending from the Timing Circuit are not shown actually connected to the other circuits. In order to simplify the drawing, such timing leads are assumed (wherever shown) to be connected to correspondingly designated leads of other major component circuitry.

In FIG. 2, lead CM of the Memory Circuit is shown connected to the movable contact of a switch SWCM, one position of which connects to plus five volts (direct-current potential with negative side assumed to be grounded) and the other position of which connects to ground (i.e., zero volts direct-current potential). The normal functioning of the Memory Circuit requires that lead CM be connected to plus five volts: the significance of switching lead CM from plus five volts to ground will be discussed hereinafter.

TIMING CIRCUIT (FIGS. 27 AND 28)

Figure 27:
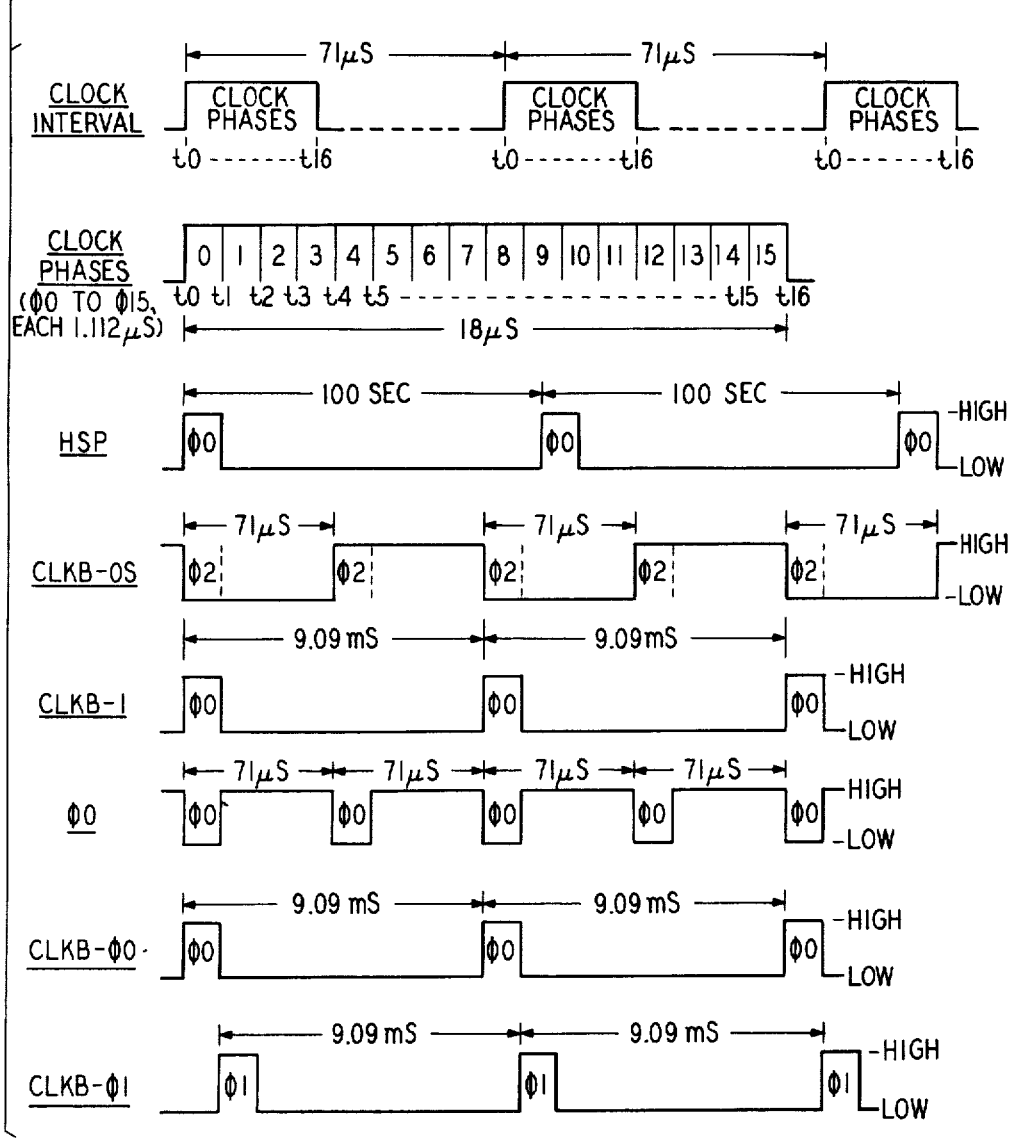
FIGS. 27 and 28 show all of the timing signals used to control the various components of the system.
Figure 28:
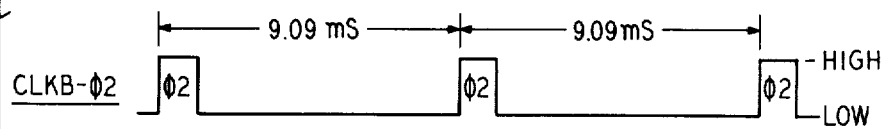
Figure 28:
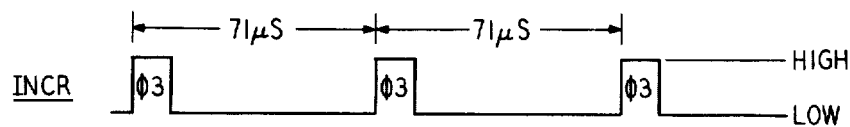
Figure 28:
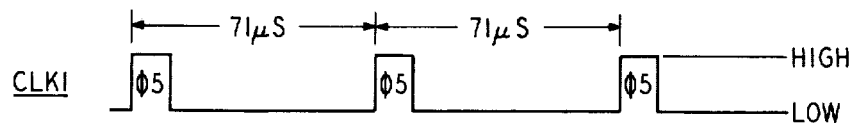
Figure 28:
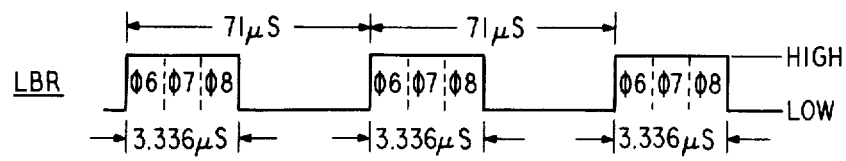
Figure 28:
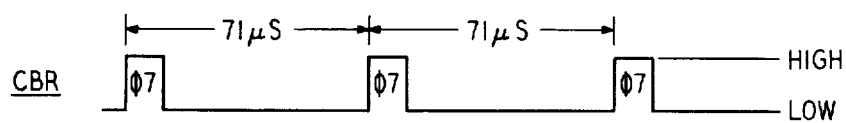
Figure 28:
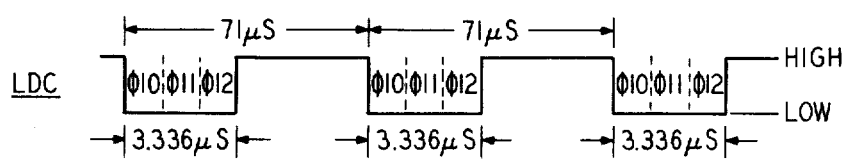
Figure 28:
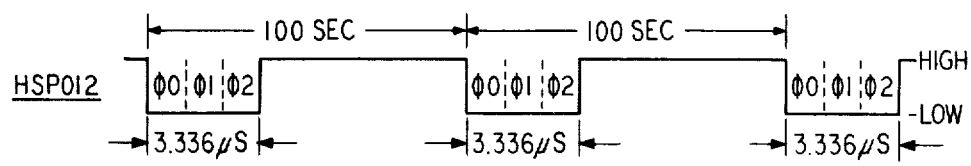

The Timing Circuit shown as a box in FIGS. 1 and 2 is not shown herein in detail since it is quite well known to provide such circuitry for producing control signals of the type shown in FIGS. 27 and 28.

As shown in FIG. 27, the basic clock interval is 71 microseconds ($\mu$s) with 16 clock phases being produced during the first 18$\mu$s of each clock interval, each of the 16 clock phases being of 1.112$\mu$s duration. The clock phases are designated $\phi 0$ to $\phi 15$, referred to herein as phase zero to phase 15.

Each of the timing control signals of FIG. 27 is as follows: the hundred-second-pulse HSP is a HIGH signal during phase zero every 100 sec; CLKB-OS is a LOW signal every 9.09ms starting with phase two and lasting for 71$\mu$s; CLKB-1 is a HIGH signal every 9.09ms at phase zero; $\phi 0$ is a LOW signal every 71$\mu$s at phase zero; CLKB-$\phi 0$ is a HIGH signal every 9.09ms at phase zero; and, CLKB-$\phi 1$ is a HIGH signal every 9.09ms at phase one.

Each of the timing control signals of FIG. 28 is as follows: CLKB-$\phi 2$ is a HIGH signal every 9.09ms at phase two; INCR is a HIGH signal every 71$\mu$s at phase three; CLK1 is a HIGH signal every 71$\mu$s at phase five; LBR is a HIGH signal every 71$\mu$s during phases six, seven, and eight (3.336$\mu$s); CBR is a HIGH signal every 71$\mu$s at phase seven; LDC is a LOW signal every 71$\mu$s during phases 10, 11, and 12 (3.336$\mu$s); and, HSPO12 is a LOW signal every 100 sec during phases zero, one, and two.

As previously mentioned, in subsequent description of various circuits, it is assumed that the above timing control signals are applied to correspondingly designated leads even though such connections are not shown in FIGS. 1 and 2.

SIMPLE CIRCUIT SYMBOLS AND CONVENTIONS (FIGS. 9)

The following conventions are followed in the circuitry of the drawing: a circle enclosing a plus sign indicates the positive terminal of a direct-current potential source, the negative terminal of which is assumed to be grounded; a circle enclosing a minus sign indicates the negative terminal of a direct-current potential source, the positive terminal of which is assumed to be grounded; zero volts direct-current potential is considered as ground; a HIGH logic level signal may be designated as "HIGH" of H or 1 and signifies a direct-current potential equal to or greater than about plus three volts; a LOW logic level signal may be designated as "LOW" or L or 0 and signifies a direct-current potential of approximately zero volts (i.e., ground potential).

Figure 9:
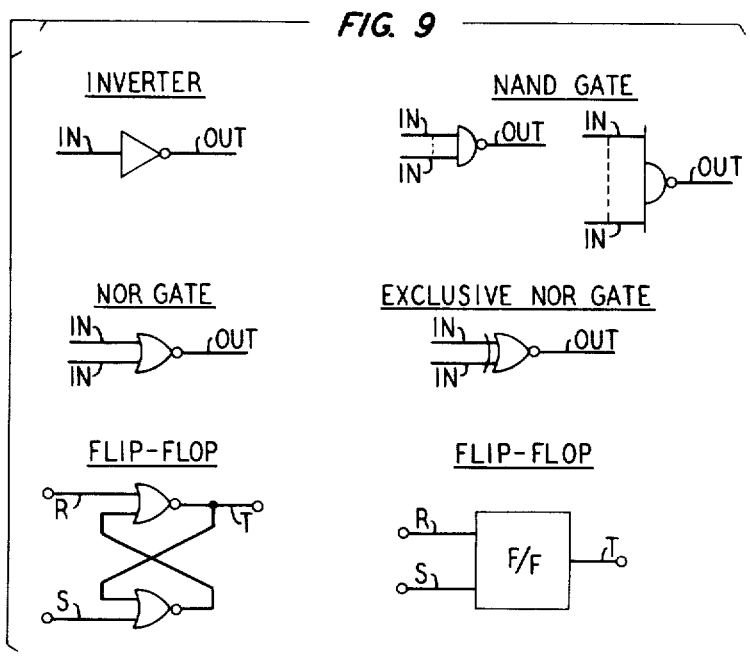
FIG. 9 shows some simple circuit symbols used at various places throughout the drawing.

In FIG. 9, the inverter is a device, for example a Western Electric (WE) integrated circuit (IC) 41BS or 41BP, whose output OUT is at a logic level opposite to its input IN; the NAND gate is a device (e.g., WE IC 41AA, 41U, or 41BW) whose output is HIGH if any input is LOW and whose output is LOW only if all of its inputs are HIGH; the NOR gate is a device (e.g., WE IC 41BR) whose output is LOW if any input is HIGH and whose output is HIGH only if both of its inputs are LOW; and, the EXCLUSIVE NOR gate is a device (e.g., WE IC 41BN) whose output is LOW if its inputs are at different logic levels and whose output is HIGH if its inputs are at the same logic level.

In FIG. 9, a flip-flop is shown as a box with input terminals R (reset) and S (set) and output terminal T. The flip-flop is made up of two NOR gates cross-connected as shown. If R and S are both LOW, T can be stable at either a LOW or a HIGH level. If R goes from LOW to HIGH, T is forced to LOW (i.e., the flip-flop is reset) regardless of the signal level on S. If R goes from HIGH to LOW, T stays LOW if S is LOW; and, if R goes from HIGH to LOW, T goes from LOW to HIGH if S either is HIGH or goes from LOW to HIGH.

SCAN CIRCUIT (FIG. 3)

Figure 3:
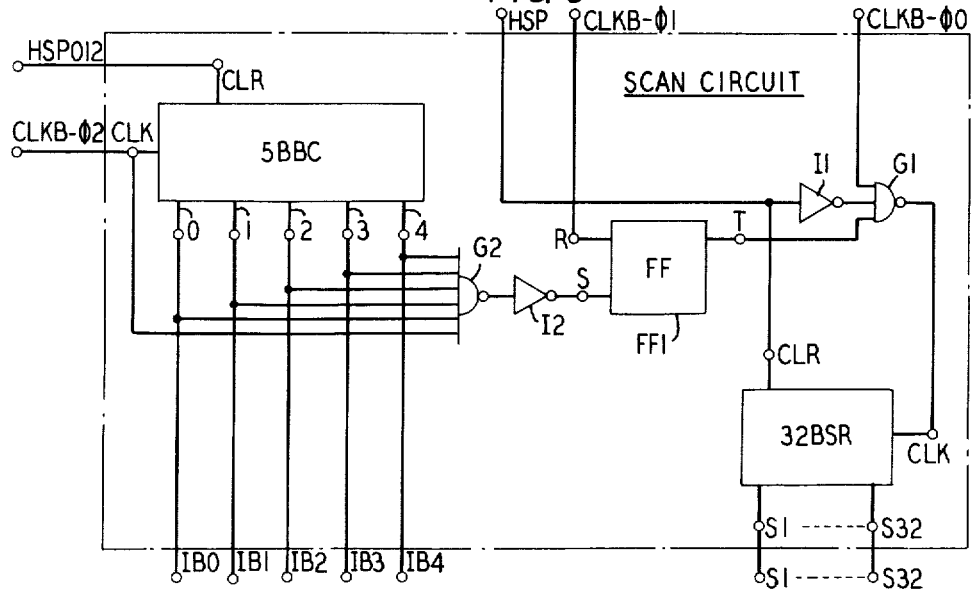
FIG. 3 shows how the Scan Circuit is made up from simple circuit symbols and from other circuitry of FIGS. 10 through 14.
Figure 10:
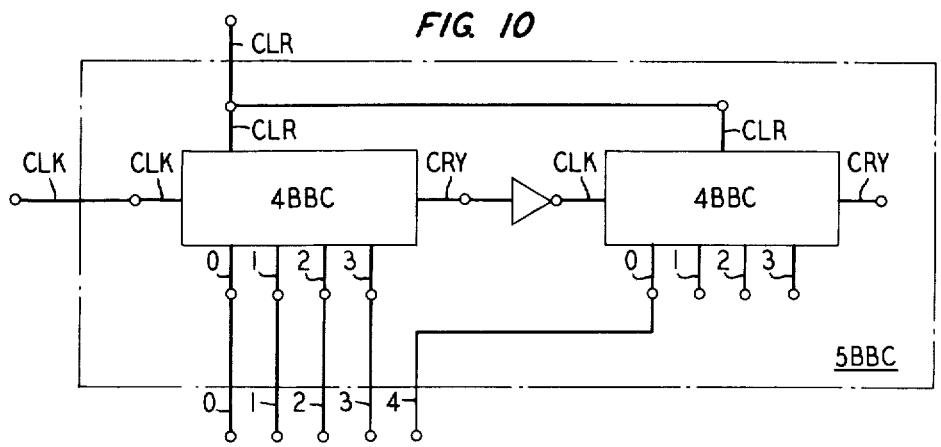
Figure 11:
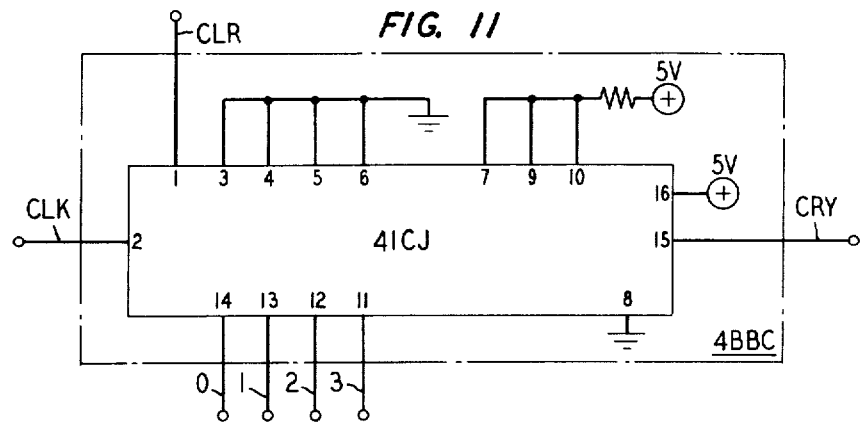
Figure 12:
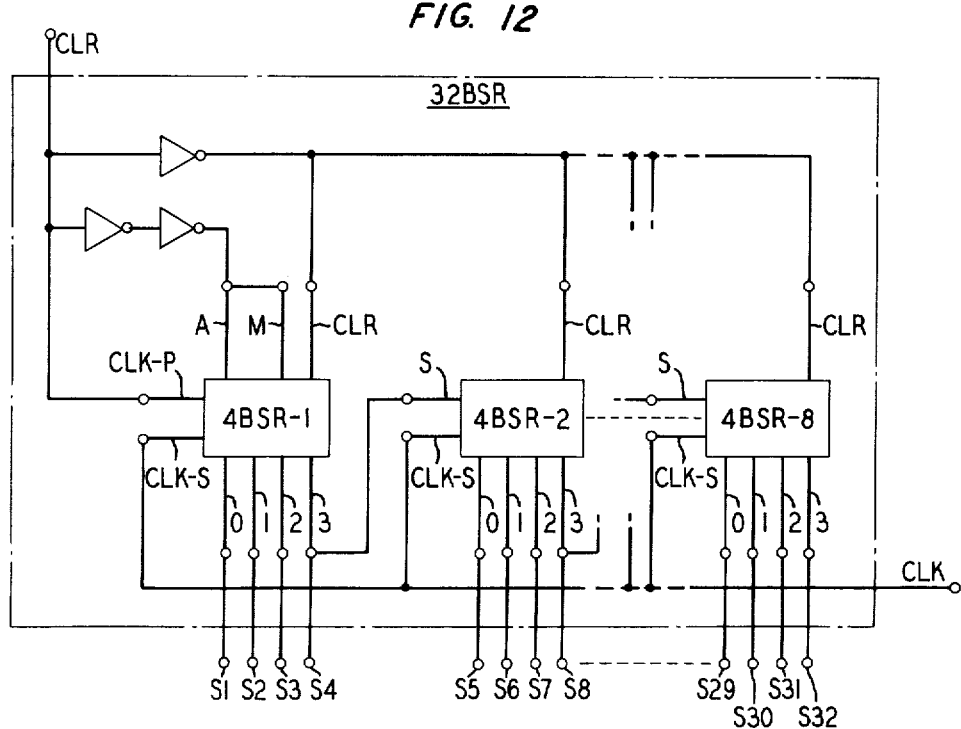
Figure 13:
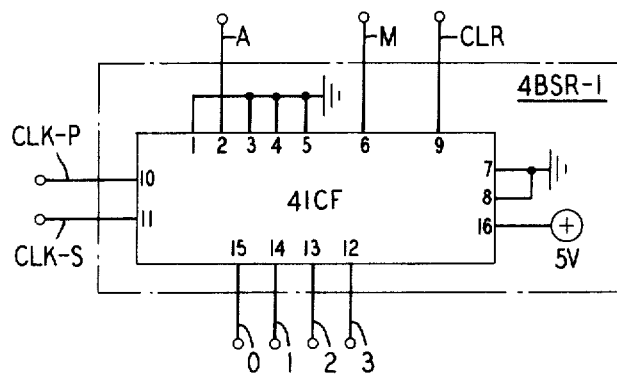
Figure 14:
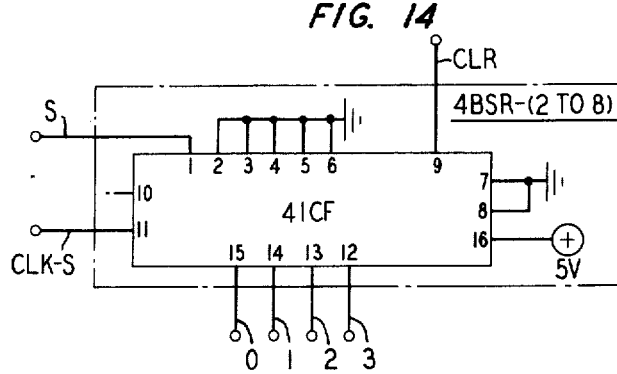

FIG. 3 shows how the Scan Circuit is arranged using a five-bit binary counter 5BBC and a 32-bit shift register 32BSR. The 5BBC of FIG. 3 is made up as shown in FIG. 10 using two four-bit binary counters 4BBC which are formed as shown in FIG. 11 by suitably arranging a WE IC 41CJ. The 32BSR of FIG. 3 is made up as shown in FIG. 12 using eight four-bit shift registers 4BSR-1 and 4BSR-2 through 4BSR-8 which are formed as shown in FIGS. 13 and 14 by suitably arranging a WE IC 41CF.

Figure 4:
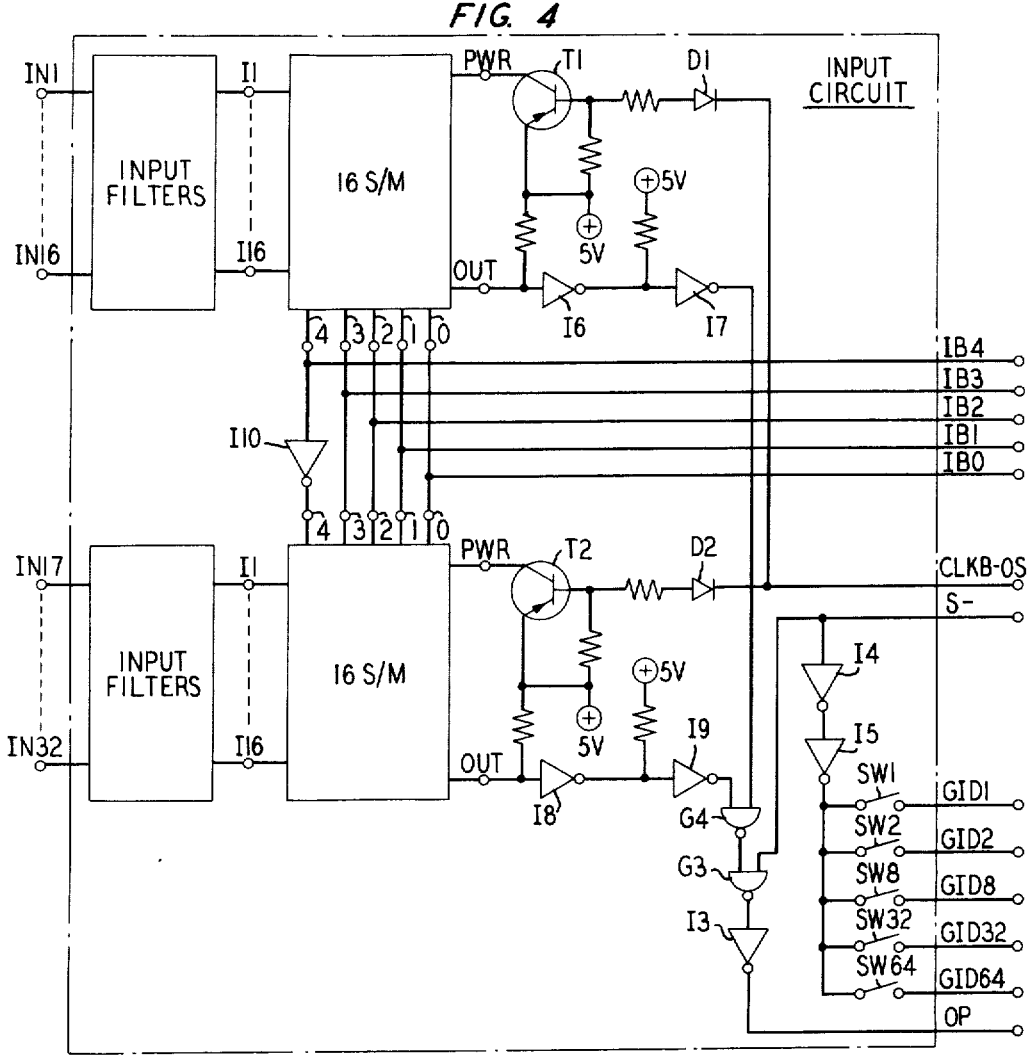
FIG. 4 shows how an Input Circuit is made up from simple circuit symbols and from the circuitry of FIG. 15.

The HSPO12 signal clears the 5BBC so that each of its outputs 0 to 4 is held LOW through phases 0, 1, and 2 at the start of the scanning cycle (i.e., the start of the first 9.09ms scan interval). The CLKB-∠2 signal has no effect upon the 5BBC during the HSPO12 signal. Each of the output leads IB0 to IB4 of the Scan Circuit is LOW extending to each of the Input Circuits of FIG. 2; and, this condition will prevail until phase two at the start of the second 9.09ms scan interval (see FIG. 32). In the description to follow of an Input Circuit, as shown in FIG. 4, it will be seen that the condition of a LOW on all of the leads IB0 to IB4 of FIG. 3 will allow the scanning of the first input IN1 of the selected Input Circuit. Again in FIG. 3, the HSP signal sets the 32BSR so that its output S1 is HIGH and its other outputs S2 to S32 are LOW; and, the HSP signal, through the agency of inverter I1 and gate G1, holds HIGH the CLK input to the 32BSR during phase zero of the first 9.09ms interval, the CLKB-$\phi$O signal having no effect upon the output of gate G1 at that time. The HIGH on output S1 of the Scan Circuit, with the other outputs S2 to S32 at LOW, will select Input Circuit 1 of FIG. 2 for scanning. Also, as long as any one of the outputs 0 to 4 of the 5BBC is LOW, the input S of flip-flop FF1 will be held LOW. After the end of phase zero, the LOW CLKB-$\phi$O signal will hold HIGH the CLK input to the 32BSR throughout the rest of the first 9.09ms scan interval. The CLKB-$\phi$1 signal at phase one will force flip-flop FF1 into a stable state with its output T at LOW. The output T of flip-flop F1 will remain LOW until such time as its input S goes HIGH, which cannot happen until all of the outputs 0 to 4 of the 5BBC become HIGH, as will be discussed.

The next CLKB-$\phi$2 signal, at phase two at the start of the second 9.09ms scan interval, causes the 5BBC to advance one count so that its output lead 0 is HIGH and its output leads 1 to 4 are LOW. This condition on the output leads IB0 to IB4 will allow the scanning of the second input IN2 of the selected Input Circuit 1. In response to the other successive CLKB-$\phi$2 signals of the third through the thirty-first 9.09ms scan intervals, the 5BBC will be advanced throughout successive counts so that its output leads 0 to 4 (i.e., the output leads IB0 to IB4 of the Scan Circuit) change to allow the successive scanning of the third through the thirty-first inputs IN3 through IN31 of the selected Input Circuit 1.

The next signal CLKB-$\phi$2, at phase two at the start of the thirty-second 9.09ms scan interval, causes the 5BBC to go to its full count with its output leads 0 to 4 all HIGH. This condition, in addition to allowing the scanning of the thirty-second input IN32 of the selected Input Circuit 1, causes the S input of flip-flop FF1 to go HIGH, thus to set to HIGH the output T of flip-flop FF1.

At the start of the next 9.09ms scan interval (i.e., the first scan interval for the next Input Circuit 2), the CLKB-$\phi$0 signal at phase zero causes the output of gate G1 to go LOW at the CLK input to the 32BSR, which causes the output lead S2 to go HIGH with the other output leads S1 and S3 to S32 being LOW. The HIGH on output lead S2 will select for scanning the second Input Circuit 2 so that for the ensuing thirty-two 9.09ms scan intervals the inputs IN1 to IN32 of Input Circuit 2 may be scanned.

The CLKB-$\phi$1 signal resets flip-flop FF1 so that its output T is again set to LOW so that the CLK input to the 32BSR will not be affected (i.e., kept HIGH) during the ensuing scanning of the inputs IN1 to IN32 of Input Circuit 2.

The CLKB-$\phi$2 signal advances the count in the 5BBC so that its output leads 0 to 4 are again all LOW, thus arranging for another succession of input scanning of the inputs IN1 to IN32 of Input Circuit 2. Also, the removal of the HIGH condition on all of the output leads 0 to 4 of the 5BBC causes the S input to flip-flop FF1 to return to LOW to maintain the LOW on output T of flip-flop FF1. Actually, the output T of flip-flop FF1 goes from LOW-to-HIGH-to-LOW as flip-flop FF1 resets to its stable state with its output T at LOW; but, this transient has no effect on the rest of the circuit.

The above process continues through the thirty-two 9.09ms scan intervals for each of the thirty-two Input Circuits. During the last 9.09ms scan interval for input I32 of Input Circuit 32, the output leads S32 and IB0 to IB4 are all HIGH. At phase zero following the last scan interval, the CLKB-$\phi$0 signal causes the CLK input to the 32BSR to go LOW to return all leads S1 to S32 to LOW, thus preventing the selection of any Input Circuit until the next hundred-second-pulse HSP (and signal HSP012) occurs to initiate another complete scan cycle. Also, at phase one, the CLKB-$\phi$1 signal resets flip-flop FF1 with its output T at LOW. Also, at phase two, the CLKB-$\phi$2 signal resets the 5BBC so that all of the leads IB0 to IB4 are LOW.

The circuit remains in the above condition until, as mentioned above, the next full scan cycle is again started by the HSP and HSP012 signals causing normalization of the circuit at the start of the next full scan cycle.

Figure 31:
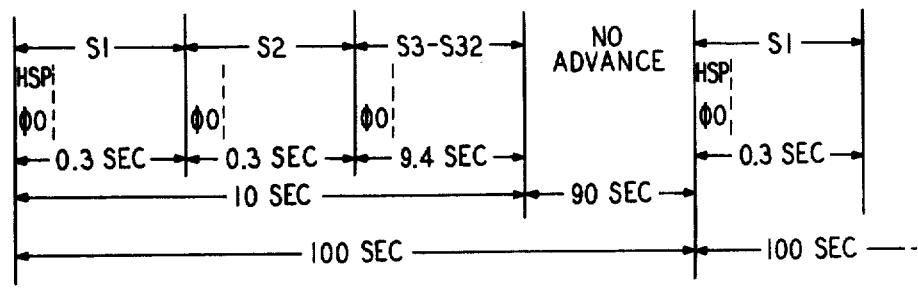

FIG. 31 illustrates the approximate timing sequence regarding the Input Circuit selection leads S1 to S32 of the Scan Circuit of FIG. 3. Thus, each of the successive leads S1 to S32 is rendered HIGH at phase zero for each successive 0.3 sec period during which the thirty-two 9.09ms scan intervals occur for scanning of the thirty-two inputs IN1 to IN32 of each of the successively selected Input Circuits 1 to 32. As is seen in FIG. 31, the complete scan cycle takes only about 10 sec such that nothing occurs during the remaining 90 sec until the start of the next full scan cycle.

Figure 32:
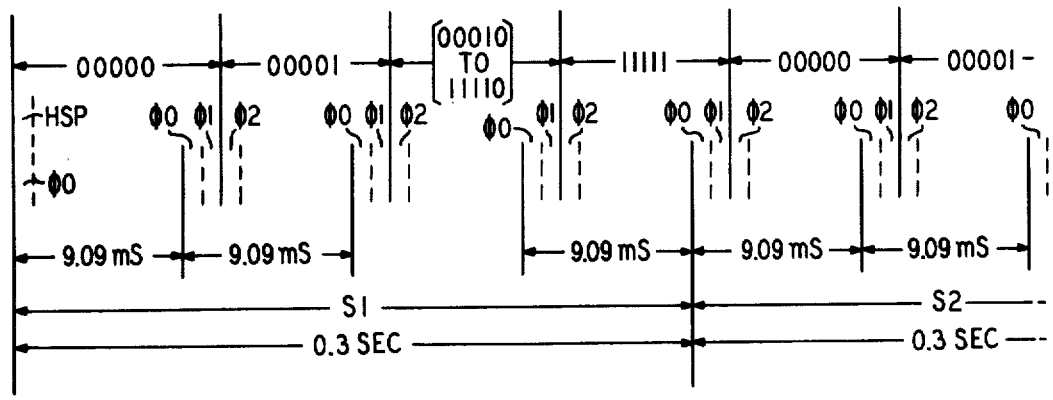

FIG. 32 illustrates the sequence of signals on the leads IB0 to IB4 from the Scan Circuit of FIG. 3 into the Input Circuits. Thus, during each 0.3 sec period during which one of the thirty-two Input Circuits is selected for scanning, the leads IB0 to IB4 will go through all 32 thirty-two combinations (beginning at phase two except for the very first scan interval which begins at phase zero) of HIGH and LOW conditions, one combination for each 9.09ms scan interval, so as to successively allow the scanning of the thirty-two inputs IN1 to IN32 of the selected Input Circuit. FIG. 36 shows the thirty-two combinations of HIGH (H) and LOW (L) signals on the leads IB0 to IB4. It is to be noted that lead IB4 is LOW for the first sixteen combinations of signals on leads IB0 to IB3 and that IB4 is HIGH for the last sixteen combinations of signals on leads IB0 to IB4.

INPUT CIRCUIT (FIG. 4)

Figure 15:
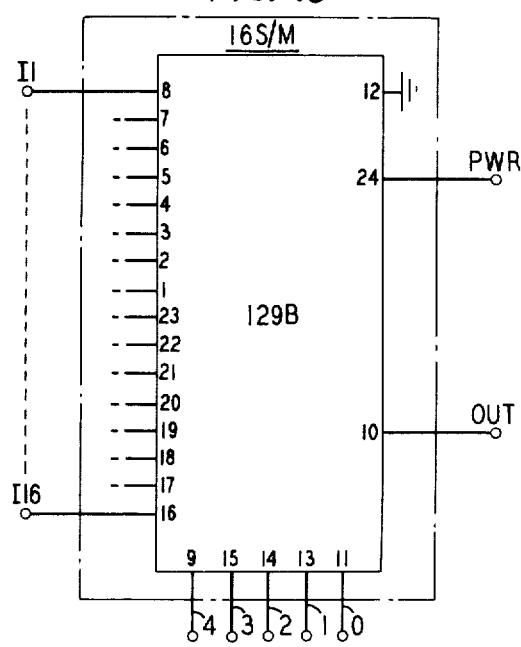

FIG. 4 shows how each of the 32 input Circuits is made up using two, 16-input selector/multiplexer circuits 16 S/M, each of which consists of a WE IC 129B arranged as shown in FIG. 15.

Each of the 32 inputs IN1 to IN32 to the Input Circuit is assumed to be connected to a separate external circuit, such as a telephone line, or trunk, or such as any other circuit or device capable of providing at the input IN1 to IN32 a status data signal condition signifying whether or not that circuit or device is busy or idle. Of course, it will be obvious that such a signal condition could be indicative of some status data other than the familiar busy-idle situation. Lead S- in FIG. 4 represents one of the 32 leads S1 to S32 from the Scan Circuit of FIG. 3. Whenever a particular Input Circuit is selected for scanning, its lead S- will be HIGH: at other times, its lead S- will be LOW. When any input IN1 to IN32 is active or busy, it will render HIGH the corresponding input I1 to I16 or the 16 S/M; and, when any such input IN1 to IN32 is inactive or idle, it will render LOW the corresponding input I1 to I16 of the 16 S/M. Typically, an open-circuit condition or a minus 48 volt potential on an input IN1 to IN32 is an inactive or idle condition and a grounded input IN1 to IN32 is an active or busy condition. These inactive-idle and active-busy status conditions are level-shifted by the Input Filter to present to the terminals I1 to I16 of the 16 S/M corresponding respective LOW (inactive-idle) and HIGH (active-busy) signal levels. Also, as is well known, the Input Filter is so constructed as to filter out short transients which do not represent legitimate input status signal transitions. As long as the CLKB-OS signal is HIGH, both transistors T1 and T2 are in the cut-off condition (i.e., OFF or nonconducting) and neither 16 S/M is powered. When the CLKB-OS signal goes LOW for 71$\mu$s at the start (i.e., at phase two) of each 9.09ms scan interval, diodes D1 and D2 allow the CLKB-OS signal to turn on (i.e., ON or conducting) transistors T1 and T2 for 71$\mu$s so as to power 16 S/M during the 71$\mu$s.

Until an Input Circuit is selected, its S- lead is LOW which holds LOW the common output lead OP (to the Memory Match Circuit of FIG. 8) through gate G3 and inverter I3 and which holds LOW the movable contacts of all five of the switches SW1 to SW64. One of the latter switches will be operated selectively to its closed position (open positions shown) according to how the inputs of that particular Input Circuit are to be grouped. If status data is to be gathered for each input individually, then switch SW1 will be closed to define the inputs of the Input Circuit in groups of one input per group. Switch SW2 is closed if the inputs are grouped in successive pairs of inputs. Likewise, switches SW8 and SW32 define the inputs as in respective groups of eight and 32 successively scanned inputs. Switch SW64 defines the input grouping as made up of the entire 32 inputs of each of two successively selected Input Circuits. Depending upon which one of the switches SW1 to SW64 is operated when an Input Circuit is selected (when its S- Lead goes HIGH for 0.3 sec at phase zero), one of the group identity leads GID1 to GID64 will be rendered HIGH (through inverters I4 and I5) into the Grouping Circuit of FIG. 5 for a purpose to be described in the next section.

When an Input Circuit is not powered (i.e., signal CLKB-OS is HIGH), the output lead OUT of each 16 S/M is HIGH, thus to provide through inverters I6 to I9 HIGH levels to both inputs to gate G4, the output of which is thus LOW at the left input to gate G3. The output of gate G3 is thus held HIGH (regardless of the signal level on lead S-) so that the output lead OP is held LOW through inverter I3.

When an Input Circuit is powered (i.e., signal CLKB-OS becomes LOW as a scan signal for 71$\mu$s at the start of phase two of each 9.09ms scan interval), the common output lead OP remains LOW unless the particular Input Circuit has been selected by a HIGH signal on lead S-. Furthermore, even if an Input Circuit is selected (HIGH on lead S-) and powered (signal CLKB-OS is LOW), the common output lead OP will remain LOW unless a particular scanned one of the inputs IN1 and IN32 is active (i.e., HIGH signal level at the corresponding input I1 to I16 of the pertinent 16 S/M).

When an Input Circuit is selected and powered, the successive input addresses on leads IB0 to IB4 (from the Scan Circuit of FIG. 3) will cause the corresponding successive inputs IN1 to IN32 to be scanned during the successive 71$\mu$ intervals (signals CLKB-OS LOW) at the starts (i.e., phases two) of the 32 successive 9.09ms scan intervals making up 0.3 sec time during which the Input Circuit is selected for scanning. As seen from FIG. 32, the input scanning address actually extends from phase two to phase two except for the very first one. If an input IN1 to IN32 is inactive when scanned, the common output lead OP will remain LOW. If an input IN1 to IN32 is active when scanned, the output lead OUT of the 16 S/M will become LOW such that the output of inverter I6 or I8 becomes HIGH, such that the output of inverter I7 or I9 becomes LOW, such that the output of gate G4 becomes HIGH, such that the output of gate G3 becomes LOW, and such that the output of inverter I3 provides a HIGH output signal on the common output lead OP into the Memory Match Circuit of FIG. 8.

Figure 29:
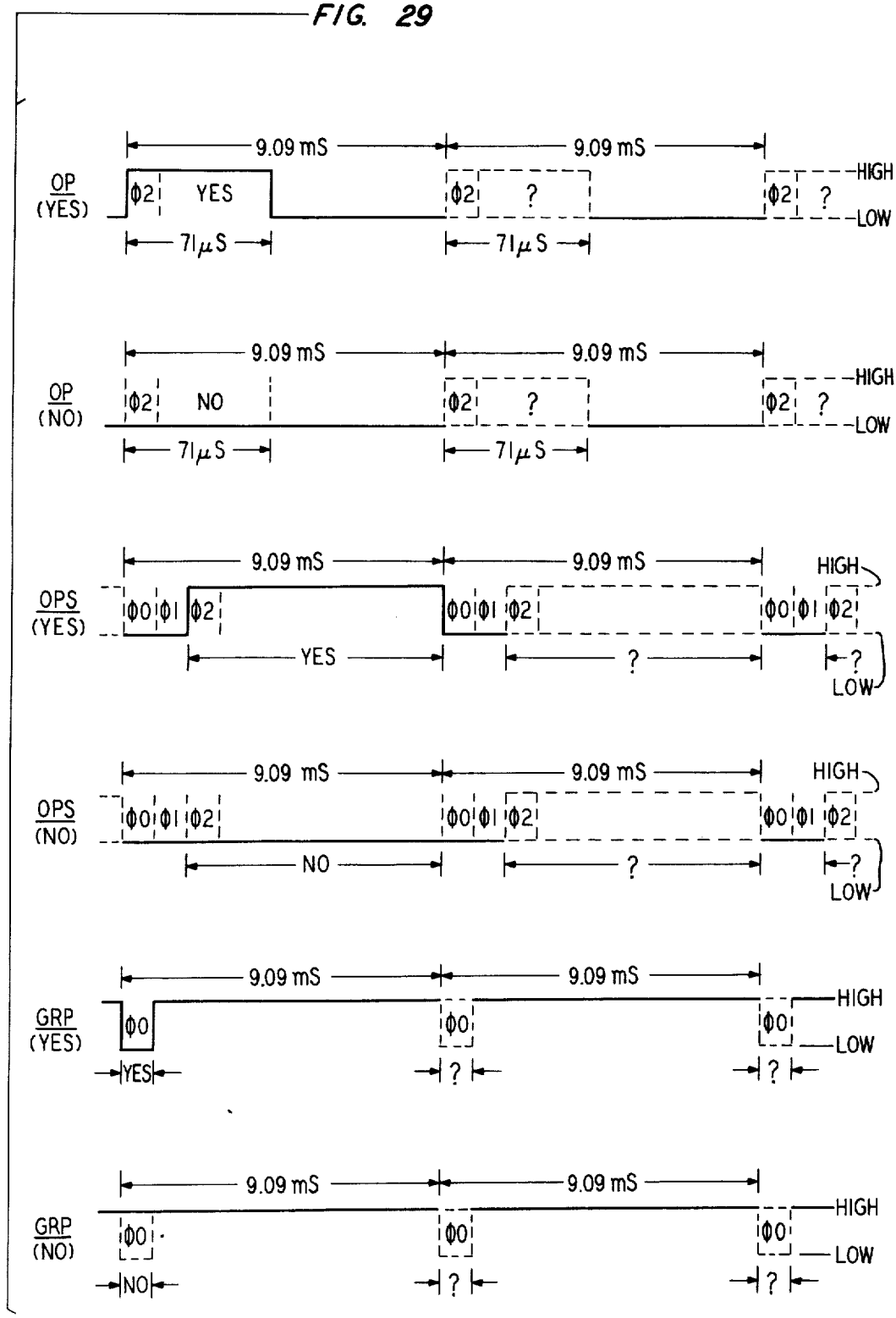
FIGS. 29 and 30 show significant internal circuit signals according to whether or not certain dynamic circuit conditions exist at certain times; and, FIGS. 31 through 36 are timing and signal charts and tables useful in explaining the nature of certain signaling conditions within the system.

FIG. 29 shows the timing of the signal on the common output lead OP. If any scanned input IN1 to IN32 is inactive, the signal on lead OP (i.e., "NO") will remain LOW; and, if any scanned input is active, lead OP (i.e., "YES") will go HIGH for 71µs at phase two at the start of the corresponding 9.09ms scan interval.

As shown in the Table of FIG. 36, the address lead IB4 is LOW for the first 16 (0 to 15 in FIG. 36) inputs IN1 to IN16, thus to provide a LOW signal to terminal 4 of the upper 16 S/M in FIG. 4 and a HIGH signal (through inverter I10) to terminal 4 of the lower 16 S/M in FIG. 4. This condition enables the other four address leads IB0 to IB3 to cause the scanning of only the first 16 inputs IN1 to IN16. When lead IB4 is rendered HIGH for the last sixteen (16 to 31 in FIG. 36) inputs IN17 to IN32, the address leads IB0 to IB3 cause the scanning of inputs IN17 to IN32 since the upper 16 S/M in FIG. 4 is disabled (HIGH on terminal 4) and the lower 16 S/M is FIG. 4 is enabled (LOW on terminal 4).

GROUPING CIRCUIT (FIG. 5)

Figure 5:
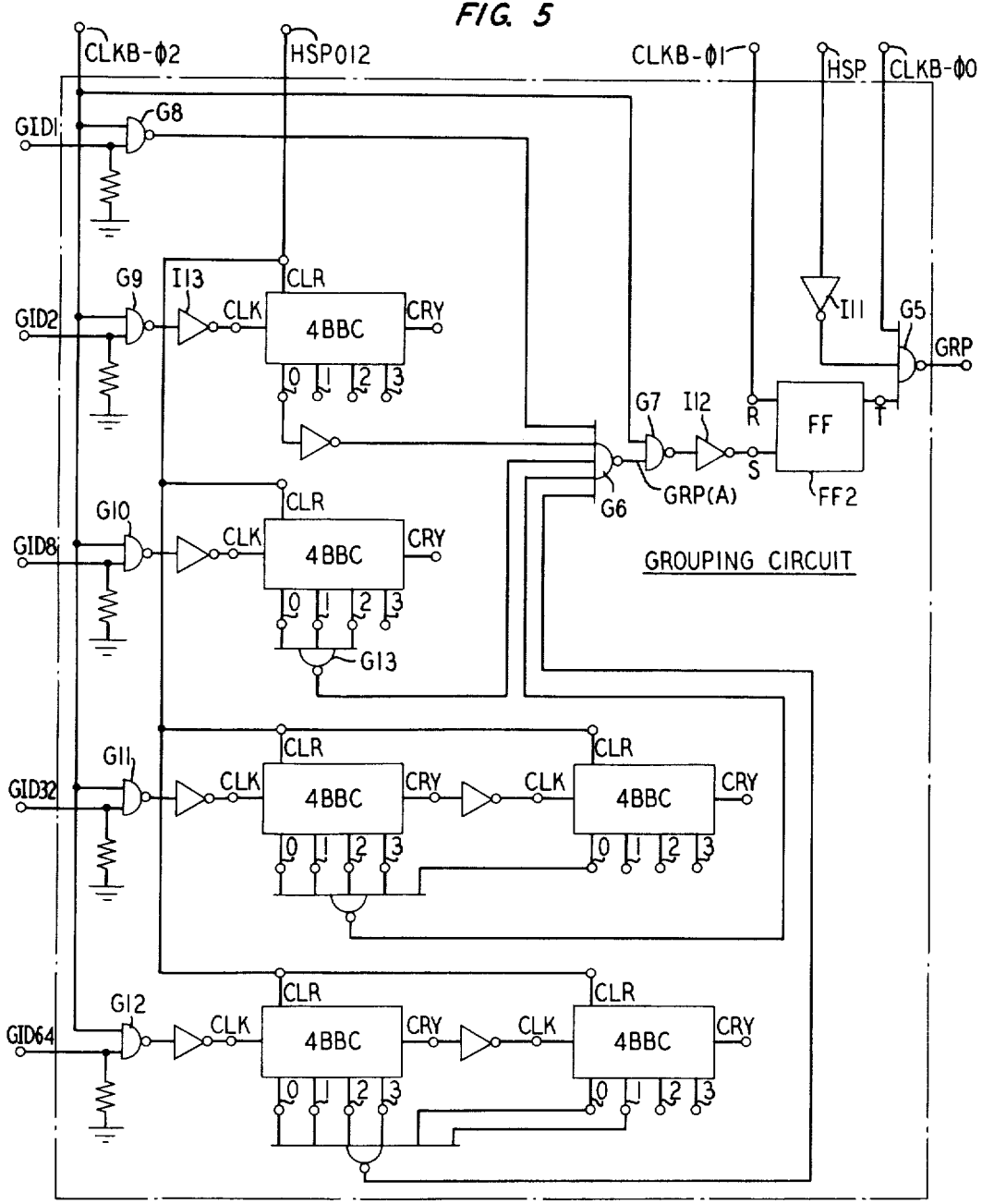
FIG. 5 shows how the Grouping Circuit is made up from simple circuit symbols and from the circuitry of FIG. 11.

FIG. 5 shows how the Grouping Circuit is made up using four-bit binary counters such as shown in FIG. 11. The purpose of this circuit is to provide at its group output lead GRP (into the Memory Match Circuit of FIG. 8) a low group signal at phase zero (see FIG. 29) following the 9.09ms scan interval during which the Grouping Circuit will have ascertained that the last scanned input circuit was the last of its group according to which one of the group identity leads GID1 to GID64 was rendered HIGH from the selected Input Circuit of FIG. 4.

At the start of a scan cycle (which occurs once every 100 sec) the signals HSP and HSP012 occur for normalizing the Grouping Circuit. The HSP signal, through inverter I11, holds the output of gate G5 HIGH at phase zero on lead GRP. The HSP012 signal clears each 4BBC (i.e., all outputs 0, 1, 2, and 3 set LOW) and holds it clear throughout phases zero, one, and two. The CLKB-$\phi$0 signal at phase zero has no effect on the output of gate G5 due to the presence of the HSP signal. At phase one, the CLKB-$\phi$1 signal at input R of flip-flop FF2 sets flip-flop FF2 so that its output T is LOW to maintain the HIGH on lead GRP, which is also maintained HIGH due to the signal CLKB-$\phi$0 which is LOW at all times other than phase zero. The only time that a LOW pulse can occur on lead GRP (see FIG. 29) is at some phase zero other than at phase zero of the very first scan interval (due to the then existing HSP signal). The output of gate G6 on lead GRP (A) is LOW (see FIG. 30) because all of the inputs to gate G6 are high at least until the CLKB-$\phi$2 occurs. Also, until signal CLKB-$\phi$2 occurs, both inputs to gate G7 are LOW that the HIGH output of gate G7 is reflected through inverter I12 as a LOW at the S input to flip-flop FF2, whose output T remains LOW. When the HIGH signal CLKB-$\phi$2 (see FIG. 28) occurs at phase two, no change occurs at input S of flip-flop FF2 unless, as discussed below lead GRP(A) should be HIGH at that time.

The signal CLKB-$\phi$2 (i.e., the same as a scan signal at phase two enables one of the input gates G8 to G12 to detect a HIGH on one of the group identity leads GID1 to GID64 from the selected Input Circuit of FIG. 4. As previously described, one of those leads GID1 to GID64 will be HIGH according to how the inputs to the selected Input Circuit are to be grouped.

If lead GID1 is HIGH, to define the input grouping as containing single successive inputs representing successive single-input groups, the output of gate G8 will go LOW at phase two, which single input count signal is reflected through gate G6 as a HIGH on lead GRP(A) at phase two (see FIG. 30), which in turn produces a HIGH at input S of flip-flop FF2 through gate G7 and inverter I12. Such a HIGH at input S of flip-flop FF2 will cause its output T to go HIGH at phase two. At the end of phase two, lead GRP(A) returns to LOW to return to LOW the S input flip-flop FF2, whose output remains at HIGH so that the CLKB-$\phi$0 signal at the next 9.09ms scan interval can create a LOW pulse at phase zero on lead GRP into the Memory Match Circuit of FIG. 8 to signify the last scanned input of a group (i.e., a group of one).

If, in FIG. 5, one of the group identity leads GID2 to GID64 is HIGH, signifying that the inputs of the selected Input Circuit of FIG. 4 are to be grouped accordingly, then the CLKB-$\phi$2 signal at phase two of the very first 9.09ms scan interval will have no effect on the cleared condition of any of the 4BBC circuits due to the presence throughout phases zero, one, and two of the HSP012 signal. Under these circumstances, each of the 4BBC circuits will be standing with all of their 0, 1, 2, and 3 at LOW, thus in binary notation signifying the first count (zero) of a series. Each 4BBC counts zero (all LOW) to capacity (all HIGH).

The 4BBC associated with G9 will provide a HIGH on its output 0 at the scanning of the second of two successively scanned inputs, which corresponds to signal CLKB-$\phi$2 at each alternate 9.09ms scan interval. This occurs at phase two when the CLKB-$\phi$2 signal causes the CLK input to the 4BBC to go HIGH as an input gate control signal from gate G9 and inverter I13, to cause output 0 of the 4BBC to go HIGH, in turn to cause the corresponding input to gate G6 to go LOW as a plural (i.e., two) input count signal. The resulting HIGH on lead GRP(A) is reflected through gate G7 and inverter I12 as a HIGH at the S input of flip-flop FF2 to cause its output T to go HIGH.

Similarly, if group identity lead GID8 is HIGH, the 4BBC associated with gate G10 will in effect count each group of eight successively scanned inputs and will provide at the output of gate G13 a LOW (i.e., a plural input count signal) at phase two of the 9.09ms scan interval corresponding to each eighth successively scanned input. Such a low output from gate G13 will, as above discussed, set flip-flop FF2 so that its output T is HIGH.

Likewise, if group identity lead GID32 is HIGH, then the 4BBC circuits associated with gate G11 will cause flip-flop FF2 to be set (its output T at HIGH) at phase two of the 9.09ms scan interval corresponding to each thirty-second successively scanned input.

As will be apparent from the above, a HIGH group identity lead GID64 will cause flip-flop FF2 to be set (its output T at HIGH) at phase two of the 9.09ms scan interval corresponding to sixty-fourth successively scanned input.

Figure 8:
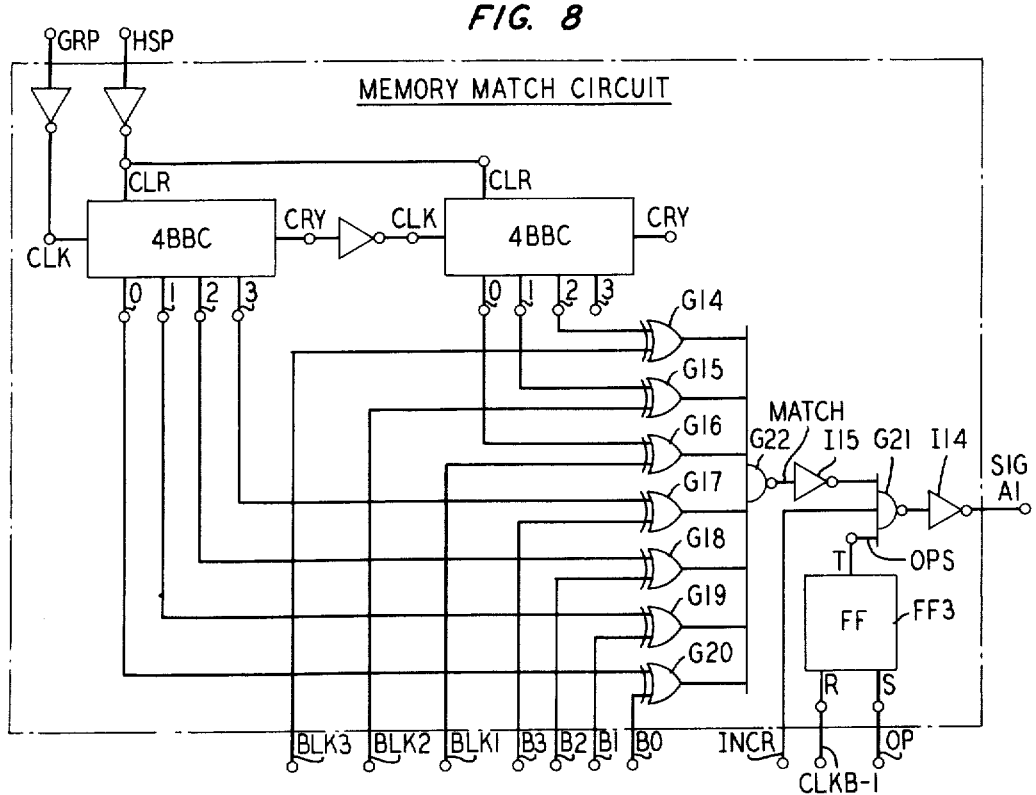
FIG. 8 shows how the Memory Match Circuit is made up from simple circuit symbols and from the circuitry of FIG. 11.

At each phase zero of each 9.09ms scan interval (other than the very first such interval at the start of the 100 sec scan cycle), a LOW pulse (i.e., group signal) will appear on lead GRP from the Grouping Circuit of FIG. 5 into the Memory Match Circuit of FIG. 8 if flip-flop FF2 has been set (its output T at High) at phase two during the immediately preceding 9.09ms scan interval to signify that that preceding scan interval marked the end of an input grouping. Such a LOW pulse on lead GRP is caused at phase zero when the other two inputs to gate G5 are found by the signal CLKB-$\phi$0 to be HIGH.

Figure 30:
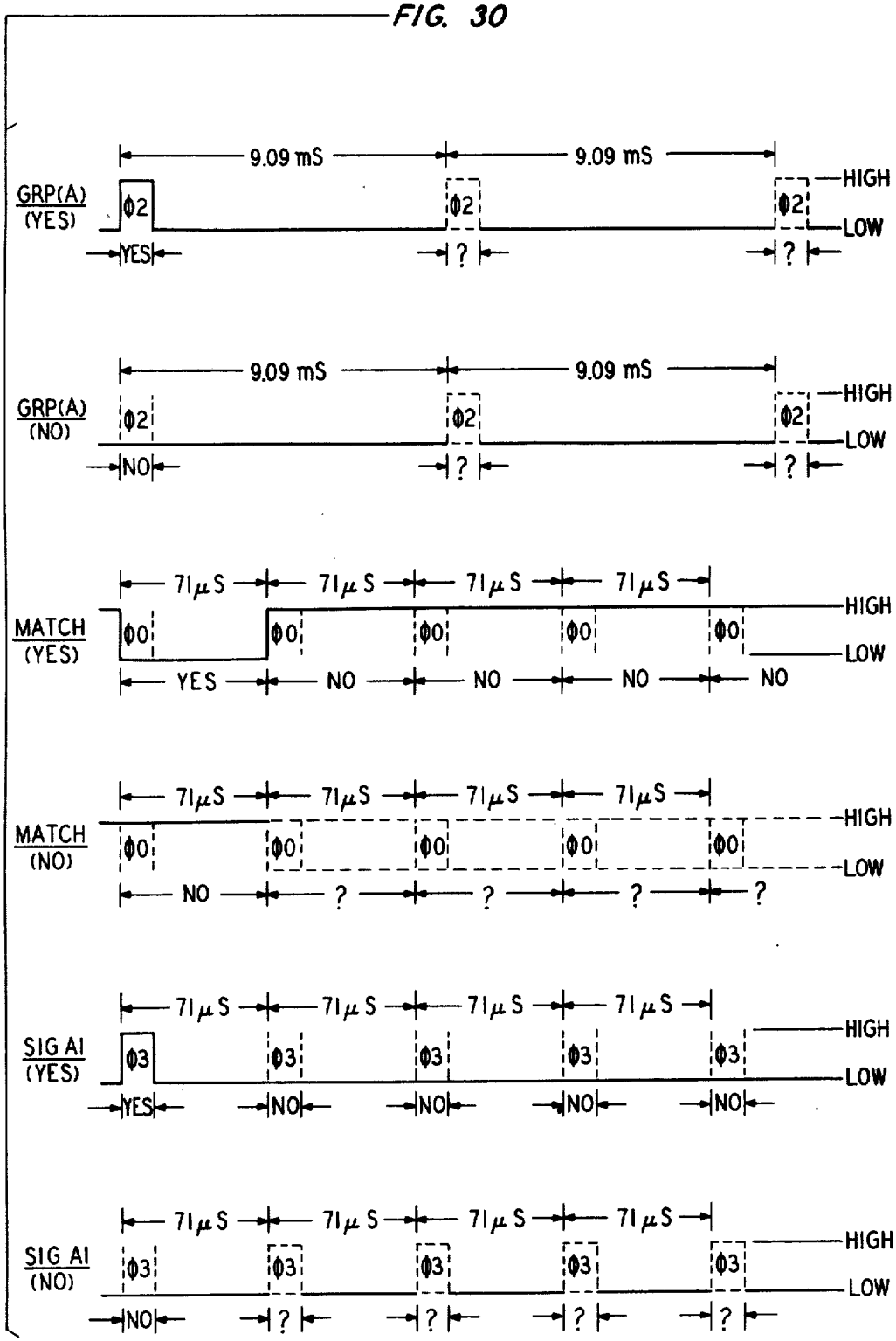

FIG. 29 shows the timing occurrence, if any (YES or NO), of a GRP signal. FIG. 30 shows the timing occurrence, if any (YES or NO), of the signal in FIG. 5 on lead GRP(A) at the output of gate G6.

In summary, at phase zero of each 9.09ms scan interval (not including the very first one corresponding to the HSP and HSP012 signals), the signal CLKB-$\phi$0 tests gate G5 to ascertain if flip-flop FF2 has been set during the immediately preceding 9.09ms scan interval to signify the end of an input grouping. If flip-flop FF2 has been so set, then the CLKB-$\phi$2 signal provides a LOW pulse at phase zero on lead GRP; otherwise, lead GRP remains HIgh.

As will be seen from the above, the Grouping Circuit of FIG. 5 contains counters (or dividers, depending upon one's point of view) controlled by the signals on the group identity leads GID1 to GID64 to provide LOW pulses on lead GRP to signify to the Memory Match Circuit of FIG. 8 when the end of an input grouping has been reached. It will be apparent that such circuitry could very readily be modified to accomplish groupings other than the input groupings of one, two, eight, 32, and 64 as used for illustrative purposes.

ADDRESSING CIRCUIT (FIG. 6)

Figure 6:
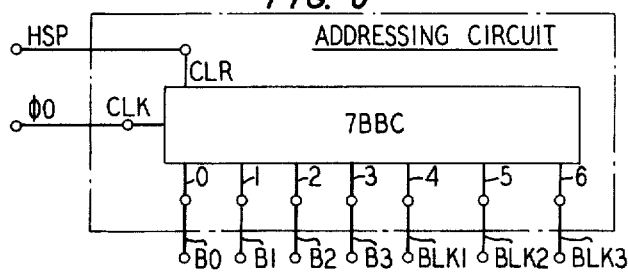
FIG. 6 shows how the Addressing Circuit is made up from other circuitry of FIGS. 11 and 16.
Figure 16:
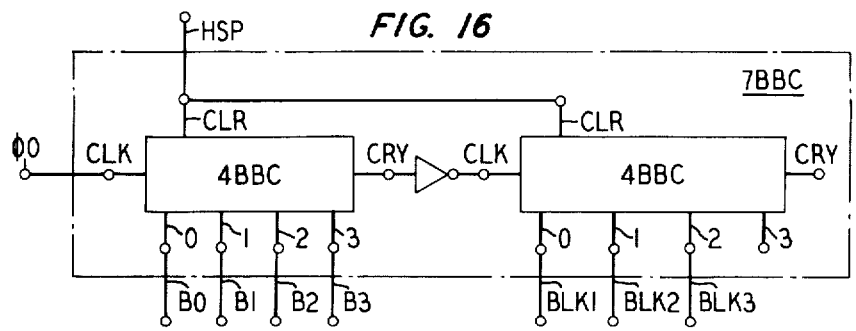

FIG. 6 shows the Addressing Circuit consisting of a seven-bit binary counter 7BBC made up, as shown in FIG. 16, of two interconnected four-bit binary counters 4BBC, each of which consists of a suitably arranged WE IC 41CJ as shown in FIG. 11.

Figure 33:
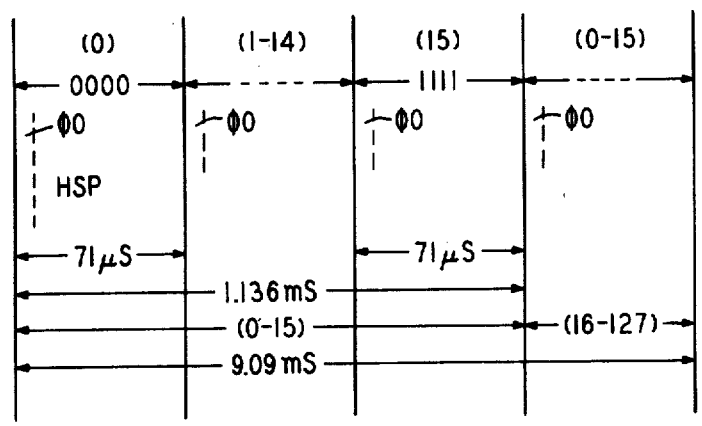
Figures 34, 35:
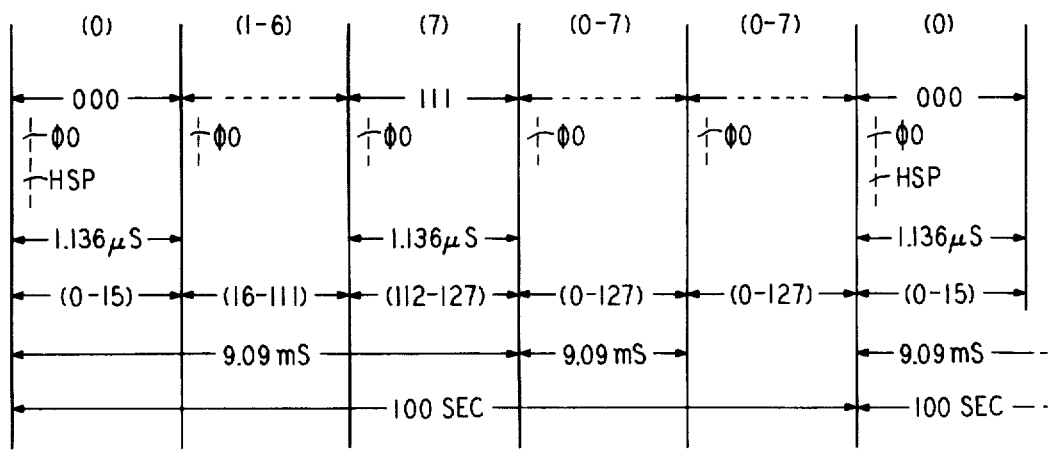

The HSP signal, at phase zero of the first 9.09ms scan interval at the start of 100 sec scan cycle, overrides the signal $\phi$0 at phase zero to clear the 7BBC so that each of its outputs B0 to B3 and BLK1 to BLK3 is LOW. Thereafter, the $\phi$0 signal at phase zero every 71$\mu$s advances the count in the 7BBC so that, as shown in FIGS. 33 and 34, during each 9.09ms scan interval (i.e., the interval during which a particular one of the 1,024 inputs is being scanned) all 128 possible seven-digit straight binary codes (0000000 to 1111111) will be generated on the output leads B0 to B3 and BLK1 to BLK3. It is to be noted that each different such seven-digit binary address code exists for 71$\mu$s from phase zero to phase zero. This address code is used in part to control the Memory Match Circuit of FIG. 8 as will be explained in the next section.

Regarding FIG. 34, it is noted that the above pattern of address codes is repeated for each 9.09ms scan interval throughout the entire 100 sec scan cycle and that the next HSP signal, et cetera, resynchronizes the address code generation at the start of a subsequent 100 sec scan cycle. In this regard, as previously mentioned with respect to FIG. 31, only about 10 sec of the 100 sec scan cycle is used to scan all 1,024 inputs; however, during that 10 sec time the address code generation by the Addressing Circuit of FIG. 6 will have repeated itself 1,024 times so that the full pattern of 128 address codes occurs for each of the 1,024 scanned inputs.

MEMORY MATCH CIRCUIT (FIG. 8)

FIG. 8 shows how the Memory Match circuit is made up of two four-bit binary counters 4BBC, each of which consists of WE IC 41CJ suitably arranged as shown in FIG. 11.

The purpose of the Memory Match Circuit is to provide at its output lead S1G A1 a HIGH signal at phase three (see FIG. 30) of the 71$\mu$s interval (1) during which the seven-digit straight binary code i.e., the binary bit count) from the 4BBC circuits matches the seven-digit straight binary code on leads B0 to B3 and BLK1 to BKL3 from the Addressing Circuit FIG. 6 and (2) during which the INCR signal at phase three (see FIG. 28) finds flip-flop FF3 set with its output T at HIGH (see FIG. 29) on lead OPS, signifying that the presently scanned input has been found active. A HIGH signal on lead S1G A1 into the Memory Circuit of FIG. 7, as explained in the next section, will increment the proper memory location as an accumulation of input activity status.

The HSP signal, at phase zero of the first 9.09ms scan interval at the start of the 100 sec scan cycle, clears the 4BBC circuits so that each of their outputs 0, 1, 2, and 3 is LOW, thus to present to the gates G14 to G20 the address LLLLLLL (i.e., seven LOWs representing address zero of 128 possible such codes zero to 127) as a bit count state of zero. This condition will prevail until and unless a GRP signal (see FIG. 29) from the Grouping Circuit of FIG. 5 appears at the input GRP to the Memory Match Circuit of FIG. 8 to cause the 4BBC circuits to advance their bit count state to the next address HLLLLLL representing address one of the possible 128 such addresses (i.e., the bit count state increased by one). Thus, so long as no GRP signal appears, the address generated by the 4BBC circuits of FIG. 8 will remain at LLLLLLL, which, as will be understood in connection with the description of the Memory Circuit of FIG. 7, will cause active scanned input status counts to be accumulated at the same memory location address (i.e., as a grouped accumulation).

In FIG. 8 the INCR signal (see FIG. 28) is LOW except for a HIGH at phase three every 71$\mu$s. Thus, the output of gate G21 is held HIGH at all times except for the possibility of its going LOW at phase three of a particular 71$\mu$s interval. Thus, as shown in FIG. 30, the signal level of the output lead S1G A1 in FIG. 8 will be LOW through inverter I14 at all times except for the possibility of its going HIGH during phase three of a 71$\mu$s interval.

As previously described, as shown in FIG. 29, the signal level on lead OP, from an input circuit of FIG. 4 into the Memory Match Circuit of FIG. 8, will be LOW at all times except for the possiblity of its going HIGH at phase two for 71$\mu$s at the start of each 9.09ms interval. It will be recalled that such a HIGH signal on lead OP represents that the scanned input is found to be active; otherwise, an inactive scanned input will cause lead OP to remain LOW.

The CLKB-1 signal (see FIG. 27) is normally LOW but will go HIGH at the R input flip-flop FF3 at phase zero at the start of each 9.09ms scan interval; and, that HIGH signal GLKB-1 will reset flip-flop FF3 to that one of its stable states wherein its output T on lead OPS is LOW to maintain a LOW on the output lead S1G A1 during the phase zero. Output T of flip-flip FF3 will thus remain LOW (to maintain a LOW on the output lead S1G A1) an entire 9.09ms interval unless a change in the state of flip-flop FF3 is caused by a proper signal on lead OP to terminal S of flip-flop FF3.

As above mentioned, an active scanned input will cause the OP lead to terminal S to flip-flop FF3 to go HIGH (see FIG. 29) for 71μs at phase two of the first 71μs interval of the 9.09ms scan interval for the input circuit; otherwise, an inactive input will cause lead OP to remain LOW. If lead OP goes HIGH due to an active scanned input, Flip-flop FF3 will be set (at phase two of the first 72μs period of the 9.09ms scan interval) to its other stable state wherein its output T is HIGH.

Figure 7:
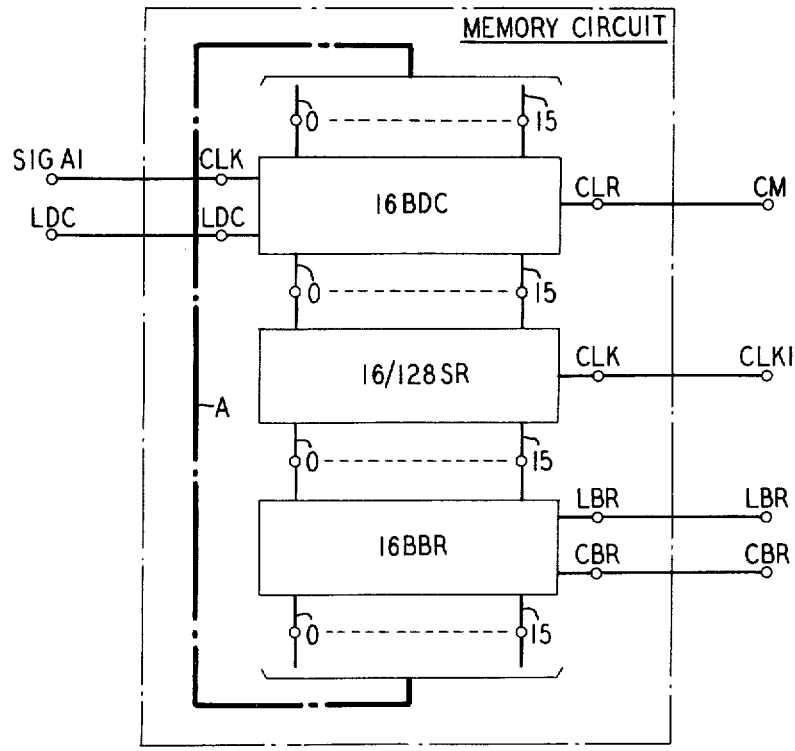
FIG. 7 shows how the Memory Circuit is made up from circuitry of FIGS. 17 through 26.

When the INCR signal goes HIGH at phase three of every 71μs period, lead S1G A1 will provide a HIGH pulse to the Memory Circuit of FIG. 7 (1) only if output T of flip-flop FF3 is HIGH and (2) only if the upper input to gate G21 is HIGH from inverter I15.

As has been explained with respect to the Addressing Circuit of FIG. 6, the binary address code on leads B0 to B3 and the BLK1 to BLK3 into the Memory Match Circuit of FIG. 8 will start at LLLLLLL (address zero) and will progress through all of its 128 binary conditions to HHHHHHH (address 127) one at a time during successive 71μs periods at phases zero during each 9.09ms scan interval. Whenever gates G14 to G20 detect a match between the address generated on the output leads 0, 1, 2, and 3 of the 4BBC circuits (i.e., The generated seven-bit count state) and the address generated on the leads B0 to B3 and BLK1 to BLK3, the normally HIGH ouput of gate G22 on the MATCH lead (see FIG. 30) will go LOW, thus to cause the upper input to gate G21 to go HIGH through inverter I15. When such a match occurs, it signifies that the location address in the Memory Circuit of FIG. 7 corresponding to the address generated by the Addressing Circuit of FIG. 6 belongs to the group of inputs corresponding to the address generated by the 4BBC circuits of the Memory Match Circuit of FIG. 8.

When the above address match occurs, the signal on the lead MATCH will remain LOW for 71μs (see FIG. 30) beginning with phase zero such that the upper input to gate G21 will be rendered HIGH for the corresponding 71μs period. When the INCR signal goes HIGH at phase three of each 71μs period (See FIG. 28), the output lead S1G A1 will provide HIGH pulse at phase three (see FIG. 30) to respresent an active scanned input represented by a HIGH signal level at output T of flip-flop FF3.

For each 9.09ms scan interval during which each of the 1,024 inputs is scanned, there can be only one HIGH signal at only one phase three on lead S1G A1 and such a HIGH signal can occur only for an active scanned input (i.e., lead OPS from output T of flip-flop FF3 at HIGH) and can occur only for a match condition (i.e., upper input of gate G21 at HIGH); and, the only time that a match condition can occur is during the 71μs period that matching memory location addresses are generated.

The CLKB-1 signal at phase zero (see FIG. 27) at the start of each succeeding 9.09ms interval resets flip-flop FF3 so that its output is LOW to disable gate G21.

As has been discussed previously with regard to the Grouping Circuit of FIG. 5, a LOW pulse can appear on lead GRP into FIG. 8 (1) only at phase zero at the beginning of a 9.09ms scan interval and (2) only if the immediately preceding 9.09ms scan interval has been used to scan the last input of a prescribed group of inputs. Thus, the memory location address generated by the 4BBC circuits of FIG. 8 (i.e., the generated seven-bit count state of the 4BBC circuits) is always adjusted properly at phase zero at the start of the 9.09ms scan interval representing the scanning of the first input of a new input grouping; the status of that new first scanned input is latched (or not) by flip-flop FF3 at the following phase two; and, the match condition is ascertained at some following phase three by the repetitive INCR signal.

The Memory Match Circuit of FIG. 8 will continue to function as above described until flip-flop FF3 is reset (output T set at LOW) by the CLKB-1 signal at the first phase zero following the scanning of the last input of the last Input Circuit of FIG. 4. Since no Input Circuit of FIG. 4 can then furnish any more active input status signals, lead OP into FIG. 8 to terminal S of flip-flop FF3 will remain LOW.

The entire process will be repeated at such time as the HSP signal recurs to start another 100 sec scan cycle.

MEMORY CIRCUIT (FIG. 7)

Figure 17:
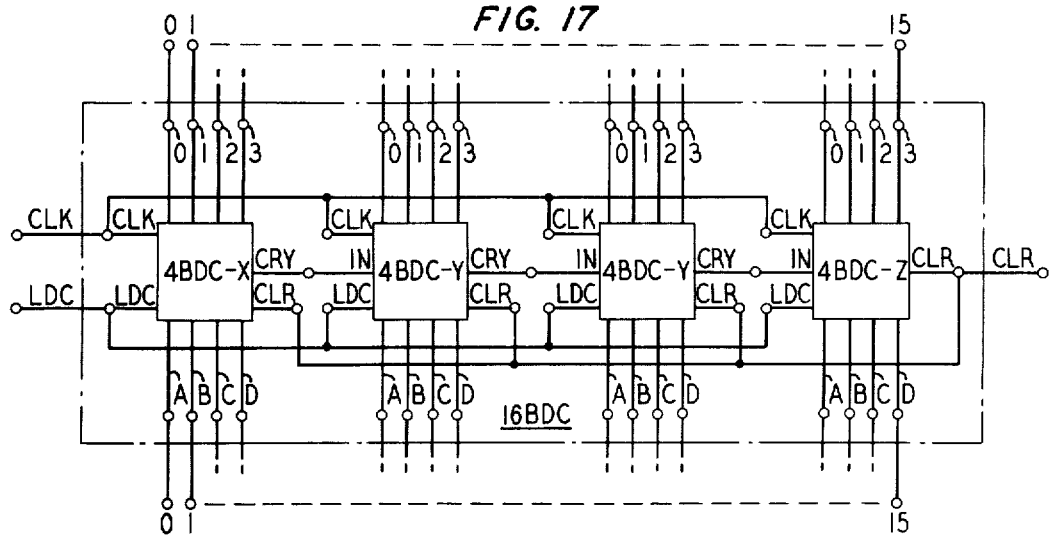
Figure 18:
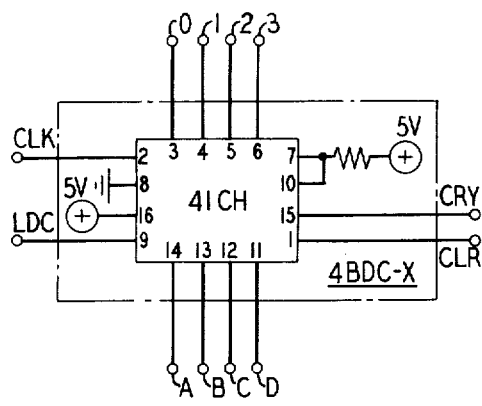
Figure 19:
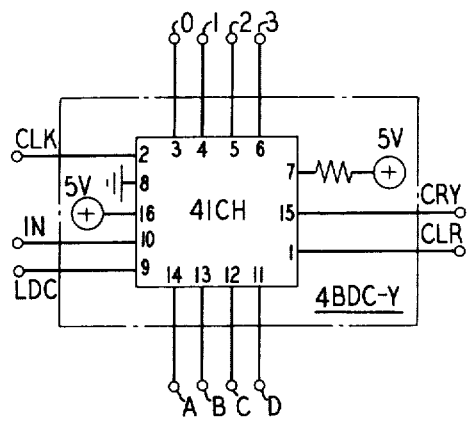
Figure 20:
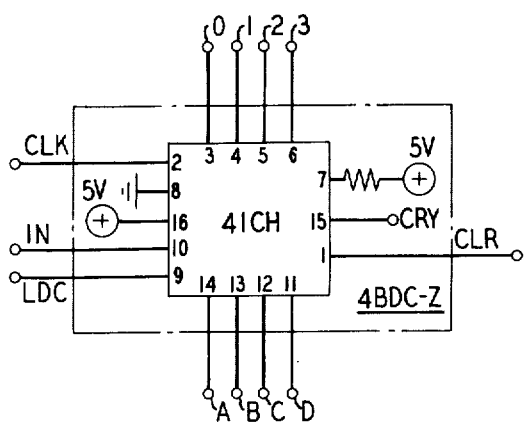
Figure 21:
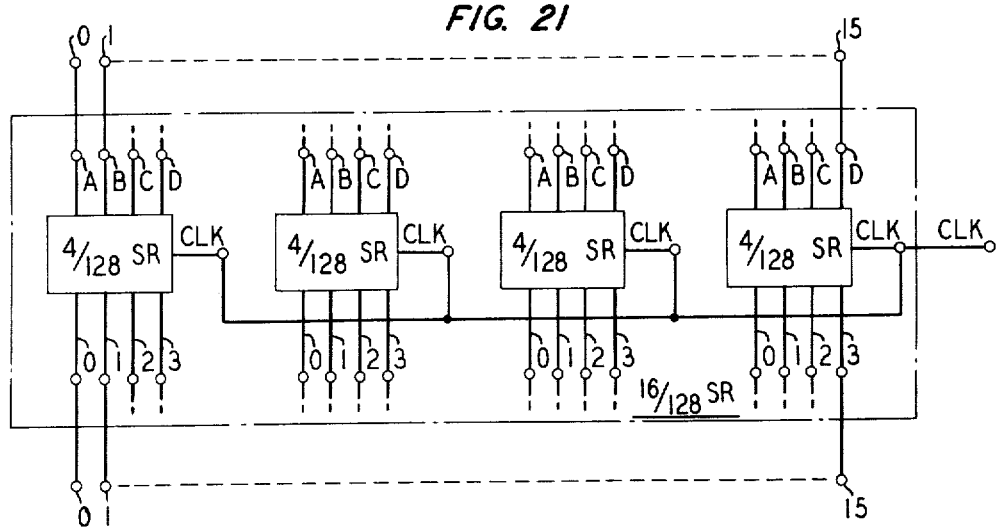
Figure 22:
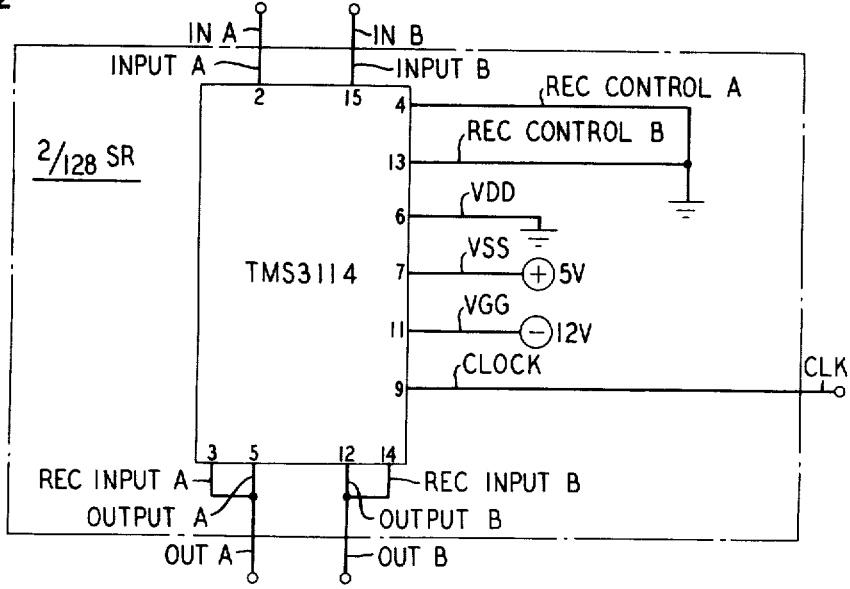
Figure 23:
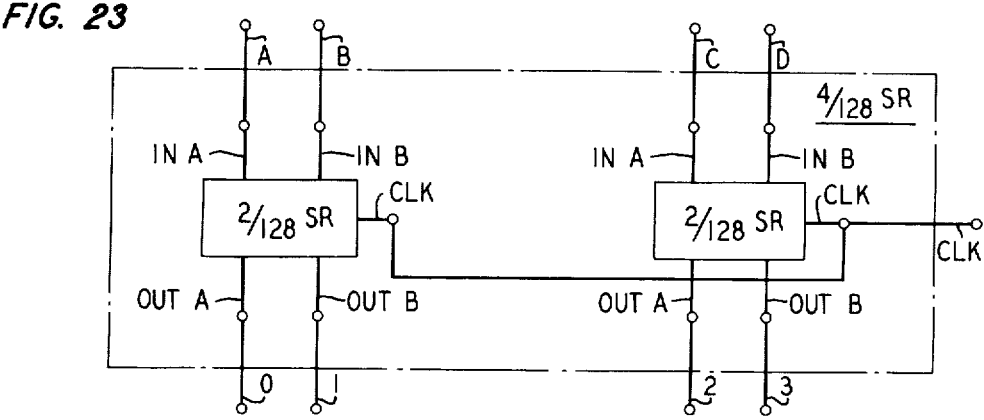
Figure 24:
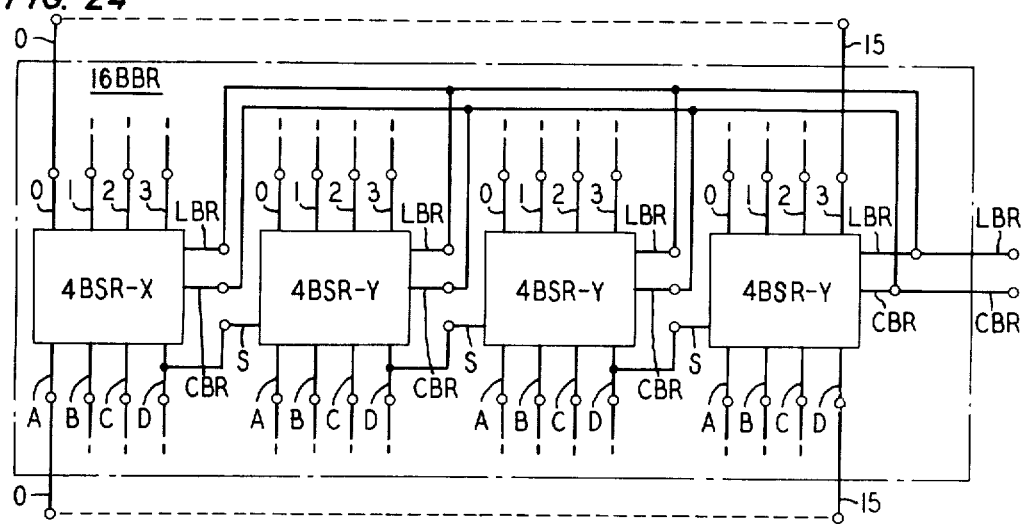
Figure 25:
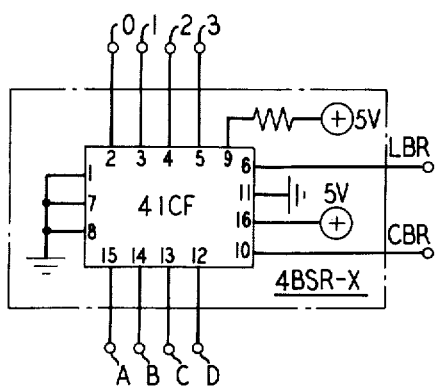
Figure 26:
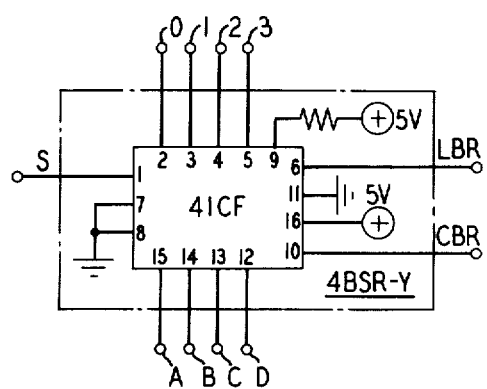

FIG. 7 shows how the Memory Circuit is made up of a 16-bit binary decade counter 16BDC, a 16 by 128-bit shift register 16/128SR, and a 16-bit buffer register 16BBR. FIG. 17 shows how the 16BDC of FIG. 7 is made up of four, four-bit binary decade counters 4BDC-X, 4BDC-Y, and 4BDC-Z, each of which consists of a WE IC 41CH device suitably arranged as shown in one of the FIGS. 18, 19, and 20. FIG. 21 shows how the 16/128SR of FIG. 7 is made up of four, four by 128-bit shift registers 4/128SR, each of which is made up as shown in FIG. 23 of two, two by 128-bit shift registers 2/128SR, each of which consists of a Texas Instruments Inc. (TI) integrated circuit (IC) TMS3114 suitably arranged as shown in FIG. 22. FIG. 24 shows how 16BBR of FIG. 7 is made up of four, four-bit shift registers 4BSR-X and 4BSR-Y, each of which consists of a WE IC 41CF suitably arranged as shown in one of FIGS. 25 and 26.

In the Memory Circuit of FIG. 7, the 16BDC accumulates a count in binary coded decimal form of a four-digit decimal number; the 16/128SR shifts the 16 bits at its input from the 16BDC through 128 shift positions to its output to the 16BBR; and, the 16BBR registers the 16 bits from the output of the 16/128SR and applies those 16 bits to the input of the 16BDC.

The switch SWCM of FIG. 2 is assumed to be in contact with the plus five volts so that lead CM in the Memory Circuit of FIG. 7 is HIGH. Lead CM is rendered LOW (switch SWCM in FIG. 2 grounded) only when it is desired, if at all, to clear out the content of the Memory Circuit of FIG. 7. Also, it will be recalled in connection with the description of the Memory Match Circuit of FIG. 8 that the lead S1G Al extending from FIG. 8 into FIG. 7 is LOW for an inactive scanned input and that for an active scanned input lead S1G Al is rendered HIGH at phase three at the start of the 71μs period during which the Memory Match Circuit of FIG. 8 finds a match between the memory location address generated by the 4BBC circuits of FIG. 8 and the memory location address generated by the Addressing Circuit of FIG. 6.

The Memory Circuit of FIG. 7 is controlled by the same internal clock which controls the other circuits. Thus, at the start (phase zero) of each 9.09ms scan interval the Memory Circuit stands with the content (i.e., the 16-bit word defining the old or previous four-digit decimal count) of the first (of 128) memory slot located as follows: standing on the output (lower) leads 0 to 15 of the 16/128SR; registered in the 16BBR; standing on the output (lower) leads 0 to 15 of the 16BBR; standing on the input (upper) leads 0 to 15 of the 16BDC; and, registered in the 16BDC. Also, as has been mentioned in the discussion of the Addressing Circuit of FIG. 6, the shifting of memory slots in the Memory Circuit of FIG. 7 is synchronized with the generation by the Addressing Circuit of the 128 binary addresses on leads B0 to B3 and BLK1 to BLK3 from FIG. 6 into the Memory Match Circuit of FIG. 8. Thus, at phase zero at the start of each 9.09ms interval, when the Memory Circuit of FIG. 7 stands with the content of the first (of 128) memory slot located as above described, this corresponds to the first 71μs period during which the Addressing Circuit of FIG. 6 generates the first (LLLLLLL) address code (zero) of the 128 such codes, the last code (127) being HHHHHHH.

As long as the input lead S1G Al in FIG. 7 is LOW, signifying inactive scanned inputs, the Memory Circuit of FIG. 7 will continually recirculate its old or previous counts and will do so in synchronism with the successive 71μs periods during which the Addressing Circuit of FIG. 6 generates the successive 128 binary memory location address codes. Thus a LOW level on lead S1G Al into FIG. 7 allows the old or previous count to be retained in the 16BDC. At phase 5 of each 71μs period, the CLK1 signal (see FIG. 28) clocks the 16/128SR so that the count in the 16BDC enters the input (upper) leads of the 16/128SR and so that the content of the next memory slot appears on the output (lower) leads of the 16/128SR. At phases six, seven, and eight of each 71μs period, the CBR signal (see FIG. 28) enables the 16 BBR to load the content of that next memory slot. At phase seven of each 71μs period, the CBR signal (see FIG. 28) actually loads the content of that next memory slot into the enabled 16BBR. At phases 10, 11, and 12 of each 71μs period, the LDC signal (see FIG. 28) causes the content of that next memory slot to be transferred from the 16BBR into the 16BDC.

The Memory Circuit of FIG. 7 will continue to recirculate as above, a step at a time every 71μs period, with the content of the successive memory slots remaining unchanged as long as the input lead S1G Al remains LOW signifying inactive scanned inputs.

If an active scanned input is detected, lead S1G Al in FIG. 7 will go HIGH at phase three (see FIG. 30) of that 71μs period corresponding to a memory location address match and corresponding to the 71μs period when the content of that particular memory slot of FIG. 7 stands on the output (lower) leads of the 16/128SR, is registered in the 16BBR, stands on the output (lower) leads of the 16BBR, stands on the input (upper) leads of the 16BDC, and is registered in the 16BDC. A HIGH lead S1G Al increments by one the content of the 16BDC so that, as above described, the signals CLK1, LBR, CBR, and LDC can advance the memory slot of FIG. 7 with the corresponding old or previous content incremented by one.

Since, as previously described, the S1G Al lead in FIG. 7 will go HIGH, if at all, only at phase three during the 71μs period corresponding to the proper memory location address generated by the 4BBC circuits of FIG. 8, the content of any particular memory slot of FIG. 7 will be incremented only due to active scanned inputs of a specified group of inputs where the incremented memory slot location is unique to the specified group. Also, as has been explained, such a group may represent any desired number of successively scanned inputs, including single inputs per group if desired.

If it is desired to completely clear the Memory Circuit of FIG. 7, lead CM may be rendered LOW by connecting switch SWCM of FIG. 2 to ground while allowing the Memory Circuit to complete at least one full cycle of circulation. The LOW on lead CM under those conditions will clear to zero all memory slots.

It is to be understood that the above-described arrangement is illustrative of the application of the principles of the invention. Other arrangements may be devised by those skilled in the art without departing from the spirit and scope of the invention.

What is claimed is:

1. A system for gathering data pertaining to the statuses of a plurality of inputs, wherein from the start of input scanning the inputs are scanned one input at a time in a prescribed sequence, wherein an output common to all inputs detects input status data on successively scanned inputs, wherein input status data detected by the common output is stored in memory having addressable memory locations to which detected input status data is steered for storage according to generated memory location addresses, and wherein the improvement comprises an input grouping arrangement comprising
    A. means for providing a succession of scan signals corresponding to the scanning of successive inputs,
    B. means selectively settable to define groups of inputs with each group containing one or more successively scanned inputs,
    C. means controlled jointly by the providing means and by the defining means to supply a succession of group signals corresponding to a succession of scanned groups,
    D. and means controlled by the supplying means to generate a succession of different memory location addresses corresponding to the succession of group signals and to generate each such address during the scanning of each input of the corresponding group.
2. The invention defined in claim 1
    A. wherein the memory location addresses are multibit binary codes.
    B. and wherein the generating means comprises a multibit binary code generator controlled by successive group signals to generate successive different multibit binary codes corresponding to successive group signals.
3. The invention defined in claim 2 wherein the code generator comprises a settable binary bit counter including
    A. output leads energized by the counter to represent in a multibit binary code the bit count state of the counter,
    B. means effective at the start of input scanning to set the counter to a prescribed bit count state, C. and means responsive to each successive group signal to change by one the bit count state of the counter.

4. The invention defined in claim 3
A. wherein the memory location addresses are straight $n$-bit binary codes,
B. wherein the counter is an $n$-bit binary counter,
C. wherein the prescribed bit count state is zero and the bit count state is changed by increasing the count state by one,
D. and wherein the counter includes $n$ output leads energized by the counter to represent the bit count state of the counter in a straight $n$-bit binary code.

5. The invention defined in claim 1
A. wherein the defining means comprises means for specifying the number of one or more scan signals corresponding to each input group
B. and wherein the supplying means supplies a group signal corresponding to each specified scan signal number.

6. The invention defined in claim 5 wherein the supplying means comprises
A. means controlled jointly by the providing means and by the specifying means to detect any specified scan signal number
B. and means controlled by the detecting means to produce a group signal corresponding to each detected scan signal number.

7. The invention defined in claim 6
A. wherein the detecting means comprises means for counting any specified scan signal number from one corresponding to an input group containing only one input up to a maximum corresponding to the largest input group
B. and wherein the producing means is controlled by the counting means to produce a group signal corresponding to each count of a specified scan signal number.

8. The invention defined in claim 7
A. wherein the counting means comprises a plurality of selectable counters each having a different count capacity corresponding to a different specified number of inputs per group and each effective when selected for use to count to its capacity
B. and wherein the specifying means selects for use a counter according to the number of inputs in a scanned group.

9. The invention defined in claim 8
A. wherein one counter is provided for an input group containing only one input,
B. wherein other counters are provided for other input groups containing more than one input,
C. wherein the one counter comprises an input gate circuit controlled jointly by the providing means and by the specifying means to provide a single input count signal for each successively scanned input so that each single input count signal represents an input group containing one input,
D. wherein each of the other counters comprises
 1. an input gate circuit controlled jointly by the providing means and by the specifying means to provide an input gate control signal for each successively scanned input
 2. and a divider circuit controlled by the input gate control signals to provide a plural input count signal for each specified group of successively scanned inputs so that each plural input count signal represents an input group containing more than one input,
E. and wherein the producing means comprises an output gate circuit controlled by the plural input count signals to produce a group signal corresponding to each input gate control signal corresponding to each count of a specified scan signal number.

10. A system for gathering data pertaining to the statuses of a plurality of inputs, wherein the inputs are arranged in subpluralities each containing an even number of inputs, wherein from the start of input scanning successive subpluralities are selected for scanning one at a time in a prescribed sequence, wherein the inputs of each selected subplurality are scanned one input at a time in a prescribed sequence, wherein an output common to all inputs detects input status data on successively scanned inputs, wherein input status data detected by the common output is stored in memory having addressable memory locations to which detected input status data is steered for storage according to generated memory location addresses, and wherein the improvement comprises an input grouping arrangement comprising
A. means for providing a succession of scan signals corresponding to the scanning of successive inputs,
B. means individual to each subplurality selectively settable to define different exclusive groups of inputs of the subplurality with each group of a subplurality containing the same number of one or more successively scanned inputs,
C. means controlled jointly by the providing means and by the defining means to supply a succession of group signals corresponding to a succession of scanned groups,
D. and means controlled by the supplying means to generate a succession of different memory location addresses corresponding to the succession of group signals and to generate each such address during the scanning of each input of the corresponding group.

11. The invention defined in claim 10
A. wherein the memory location addresses are multibit binary codes
B. and wherein the generating means comprises a multibit binary code generator controlled by successive group signals to generate successive different multibit binary codes corresponding to successive group signals.

12. The invention defined in claim 11 wherein the code generator comprises a settable binary bit counter including
A. output leads energized by the counter to represent in a multibit binary code the bit count state of the counter,
B. means effective at the start of input scanning to set the counter to a prescribed bit count state,
C. and means responsive to each successive group signal to change by one the bit count state of the counter.

13. The invention defined in claim 12
A. wherein the memory location addresses are straight $n$-bit binary codes,
B. wherein the counter is an $n$-bit binary counter,
C. wherein the prescribed bit count state is zero and the bit count state is changed by increasing the count state by one,
D. and wherein the counter includes $n$ output leads energized by the counter to represent the bit count state of the counter in a straight $n$-bit binary code.

14. The invention defined in claim 10
   A. wherein the defining means comprises means effective, upon selection of a subplurality for scanning, for specifying the same number of one or more scan signals corresponding to each input group of the selected subplurality;
   B. and, wherein the supplying means supplies a group signal corresponding to each specified scan signal number.
15. The invention defined in claim 14 wherein the supplying means comprises
   A. means controlled jointly by the providing means and by the specifying means to detect any specified scan signal number
   B. and means controlled by the detecting means to produce a group signal corresponding to each detected scan signal number.
16. The invention defined in claim 15
   A. wherein the detecting means comprises means for counting any specified scan signal number from one corresponding to an input group containing only one input up to a maximum corresponding to the largest input group
   B. and wherein the producing means is controlled by the counting means to produce a group signal corresponding to each count of a specified scan signal number.
17. The invention defined in claim 16.
   A. wherein the counting means comprises a plurality of selectable counters each having a different count capacity corresponding to a different specified number of inputs per group and each effective when selected for use to count to its capacity
   B. and wherein the specifying means selects for use a counter according to the same number of inputs in each scanned group of the selected subplurality.
18. The invention defined in claim 17
   A. wherein one counter is provided for an input group containing only one input,
   B. wherein other counters are provided for other input groups containing more than one input,
   C. wherein the one counter comprises an input gate circuit controlled jointly by the providing means and by the specifying means to provide a single input count signal for each successively scanned input so that each single input count signal represents an input group containing one input,
   D. wherein each of the other counters comprises
      1. an input gate circuit controlled jointly by the providing means and by the specifying means to provide an input gate control signal for each successively scanned input
      2. and a divider circuit controlled by the input gate control signals to provide a plural input count signal for each specified group of successively scanned inputs so that each plural input count signal represents an input group containing more than one input,
   E. and wherein the producing means comprises an output gate circuit controlled by the plural input count signals to produce a group signal corresponding to each input gate control signal corresponding to each count of a specified scan signal number.
19. The invention defined in claim 18
   A. wherein the specifying means is selectively settable to specify an even submultiple of the selected subplurality of inputs as the same number of one or more scan signals corresponding to each input group of the selected subplurality,
   B. wherein a different other counter is provided for each different specified submultiple,
   C. and wherein the divider circuit of each different other counter is arranged to provide a plural input count signal for the corresponding specified submultiple of successively scanned inputs.

* * * * *